United States Patent [19]

Ishihara

[11] Patent Number: 5,166,898
[45] Date of Patent: Nov. 24, 1992

[54] SHIFT AMOUNT FLOATING-POINT CALCULATING CIRCUIT WITH A SMALL AMOUNT OF HARDWARE AND RAPIDLY OPERABLE

[75] Inventor: Shingo Ishihara, Yamanashi, Japan

[73] Assignee: NEC Corporation, Tokyo, Japan

[21] Appl. No.: 756,294

[22] Filed: Sep. 6, 1991

[30] Foreign Application Priority Data

Sep. 7, 1990 [JP] Japan .................................. 2-237358

[51] Int. Cl.⁵ .............................................. G06F 5/01
[52] U.S. Cl. ................................ 364/748; 364/715.08
[58] Field of Search ............... 364/748, 715.08, 715.03, 364/715.04

[56] References Cited

U.S. PATENT DOCUMENTS

| | | | |
|---|---|---|---|
| 4,807,172 | 2/1989 | Nukiyama | 364/715.08 |
| 5,010,508 | 4/1991 | Sit et al. | 364/748 |
| 5,016,209 | 5/1991 | Ikeda et al. | 364/748 |
| 5,021,986 | 6/1991 | Nakamura | 364/748 |
| 5,027,308 | 6/1991 | Sit et al. | 364/748 |
| 5,075,882 | 12/1991 | Sakai et al. | 364/748 |

Primary Examiner—David H. Malzahn
Attorney, Agent, or Firm—Foley & Lardner

[57] ABSTRACT

In a floating-point arithmetic unit for performing floating-point arithmetic of first and second input data which are represented by a floating-point representation and composed of first and second exponent parts and first and second mantissa parts, a shift amount calculating circuit comprises first and second substractors (26, 27) supplied with lower (n+1) bits of the first and the second exponent parts. The first subtracter subtracts a first lower number (#EA1) from a second lower number (#EB1) to produce a first difference signal (RS1). The second subtracter subtracts the second lower number (#EB1) from the first lower number (#EA1) to produce a second difference signal (RS1). Supplied with the first and the second exponent parts, an exponent comparing unit (28) compares the first exponent part with the second exponent part to produce a comparison result signal (CP1, CP2, CP3, CP4). Responsive to the comparison result signal, a first selector (31) selects one of the first difference signal and first and second value signals ("0", "64") as a first right-shift amount signal (SD1). Responsive to the comparison result signal, a second selector (32) selects one of the second difference signal and the first and the second value signals as a second right-shift amount signal (SD2).

29 Claims, 14 Drawing Sheets

SHIFT AMOUNT FLOATING-POINT CALCULATING CIRCUIT WITH A SMALL AMOUNT OF HARDWARE AND RAPIDLY OPERABLE

BACKGROUND OF THE INVENTION

This invention relates to a shift amount calculating circuit for use in a floating-point arithmetic unit for performing floating-point arithmetic of first and second input data, each of which is represented by a floating-point representation.

In the manner well known in the art, a floating-point arithmetic unit is used in performing floating-point arithmetic of first and second input data. The floating-point arithmetic may be floating-point addition, floating-point subtraction, or the like. The first and the second input data are composed of first and second exponent parts and first and second mantissa parts. Each of the first and the second mantissa parts is N bits long, where N represents a first predetermined natural number which is greater than $2^{n-1}$ and is not greater than $2^n$, where n represents a predetermined positive integer. Each of the first and the second exponent parts in M bits long, where M represents a second predetermined natural number which is greater than the predetermined positive integer plus one.

In general, the floating points of the first and the second mantissa parts are equalized or aligned, on performing the floating-point addition/subtraction. For this purpose, the floating-point arithmetic unit includes a shift amount calculating circuit for calculating a shift amount required for such equalization. The shift amount consists of first and second right-shift amounts for use in rightwards shifting the first and the second mantissa parts, respectively.

In the manner which will later be described, a conventional shift amount calculating circuit comprises first and second exponent subtracters, an exponent comparator, first and second selector, and first and second registers. Each of the first and the second exponent subtracters is supplied with all M bits of the first and the second exponent parts. The M bits of the first and the second exponent parts are representative of first and second numbers, respectively. The first exponent subtracter subtracts the first number from the second number to produce a first difference signal representative of a first result of subtraction. The second exponent subtracter subtracts the second number from the first number to produce a second difference signal representative of a second result of subtraction. The exponent comparator is also supplied with all M bits of the first and the second exponent parts. The exponent comparator compares the M bits of the first exponent part with the M bits of the second exponent part to produce a comparison result signal indicative of a result of comparison.

The first selector is connected to the first exponent subtracter and the exponent comparator and is supplied with a value signal indicative of a shift amount of zero. Responsive to the comparison result signal, the first selector selects one of the first difference signal and the value signal to produce a first selected signal. The second selector is connected to the second exponent subtracter and the exponent comparator and is supplied with the value signal. Responsive to the comparison result signal, the second selector selects one of the second difference signal and the value signal as a second selected signal. The first and the second registers are connected to the first and the second selectors, respectively. The first register holds the first selected signal as a first held signal to produce the first held signal as a first right-shift amount signal, which indicates the first right-shift amount. The second register holds the second selected signal as a second held signal to produce the second held signal as a second right-shift amount signal, which indicates the second right-shift amount.

In the conventional shift amount calculating circuit, each of the first and the second exponent subtracters must carry out subtraction operation on all M bits of the first and the second exponent parts. As well known in the art, an adder/subtracter includes a carry generating circuit for generating carry data. In general, the adder/subtracter carries out addition/subtraction by thus generating the carry data by the carry generating circuit and then by producing a result of addition/subtraction by the carry data. Therefore, the conventional shift amount calculating circuit comprises the first and the second exponent subtracters each of which is composed of multistage structure. This is because each of the first and the second exponent subtracters must carry out the subtraction operation on all M bits of the first and the second exponent parts. As a result, the conventional shift amount calculating circuit is disadvantageous in that each of the first and the second exponent subtracters is composed of a large amount of hardware. In addition, each of the first and the second exponent subtracters consumes much of its time in subtraction.

SUMMARY OF THE INVENTION

It is therefore an object of this invention to provide a shift amount calculating circuit which is simple in structure.

It is another object of this invention to provide a shift amount calculating circuit which is of the type described and is capable of quickly or rapidly calculating a shift amount required for equalizing floating points of two mantissa parts.

Other objects of this invention will become clear as the description proceeds.

On describing the gist of an aspect of this invention, it is possible to understand that a shift amount calculating circuit is for use in a floating-point arithmetic unit for performing floating-point arithmetic of first and second input data. The first and the second input data are represented by a floating-point representation and are composed of first and second exponent parts and first and second mantissa parts. Each of the first and the second mantissa parts is N bits long, where N represents a first predetermined natural number which is greater than $2^{n-1}$ and is not greater than $2^n$, where n represents a predetermined positive integer. Each of the first and the second exponent parts is M bits long, where M represents a second predetermined natural number which is greater than the predetermined positive integer plus one. The shift amount calculating circuit is for calculating a shift amount required for equalizing the floating-point of the first and the second mantissa parts. The shift amount consists of first and second right-shift amounts for use in rightward shifting the first and the second mantissa parts, respectively.

According to the above-mentioned aspect of this invention, the above-understood shift amount calculating circuit comprises a first subtracter supplied with lower (n+1) bits of the first and the second exponent parts. The lower (n+1) bits of the first and the second exponent parts represent first and the second lower numbers, respectively. The first subtracter subtracts the first lower number from the second lower number to produce a first difference signal representative of a first result of subtraction. Supplied with the lower (n+1) bits of the first and the second exponent parts, a second subtracter subtracts the second lower number from the first lower number to produce a second difference signal representative of a second result of subtraction. Supplied with the first and the second exponent parts, comparing means compares the first exponent part with the second exponent part to produce a comparison result signal indicative of a result of comparison. Connected to the first subtracter and the comparing means and supplied with a first value signal indicative of a shift amount of zero and a second value signal indicative of a shift amount greater than the first predetermined natural number, a first selector selects, in response to the comparison result signal, one of the first difference signal and the first and the second value signals to produce a first selected signal as a first right-shift amount signal indicative of the first right-shift amount. Connected to the second subtracter and the comparing means and supplied with the first and the second value signals, a second selector selects, in response to the comparison result signal, one of the second difference signal and the first and the second value signals to produce a second selected signal as a second right-shift amount signal indicative of the second right-shift amount.

On describing the gist of a different aspect of this invention, it is possible to understand that a method is for calculating a shift amount for use in a floating-point arithmetic unit which performs floating-point arithmetic of first and second input data. The first and the second input data are represented by a floating-point representation and composed of first and second exponent parts and first and second mantissa parts. Each of the first and the second mantissa parts is N bits long, where N represents a first predetermined natural number which is greater than $2^{n-1}$ and is not greater than $2^n$, where n represents a predetermined positive integer. Each of the first and the second exponent parts is M bits long, where M represents a second predetermined natural number which is greater than the predetermined positive integer plus one. The shift amount is required for equalizing the floating-point of the first and the second mantissa parts. The shift amount consists of first and second right-shift amounts for use in rightwards shifting the first and the second mantissa parts, respectively.

According to the different aspect of this invention, the above-understood method comprises the steps of (A) comparing higher (M−n) bits of the first exponent part with the higher (M−n) bits of the second exponent part to provide a first result of comparison by judging whether a first higher value is represented by the higher (M−n) bits of the first exponent part to be less than, equal to, or greater than a second higher value represented by the higher (M−n) bits of the second exponent part; (B) comparing the higher (M−n) bits of the first exponent part with the higher (M−n) bits of the second exponent part when the first higher value is less than the second higher value to provide a second result of comparison by judging whether or not the second higher value is equal to the first higher value plus one; (C) comparing the higher (M−n) bits of the first exponent part with the higher (M−n) bits of the second exponent part when the first higher value is greater than the second higher value to provide a third result of comparison by judging whether or not the first higher value is equal to the second higher value plus one; (D) comparing lower n bits of the first exponent part with the lower n bits of the second exponent part when the first higher value is equal to the second higher value to provide a fourth result of comparison by judging whether a first lower value is represented by the lower n bits of the first exponent part to be less than, equal to, or greater than a second lower value represented by the lower n bits of the second exponent part; (E) comparing the lower n bits of the first exponent part with the lower n bits of the second exponent part when the second higher value is equal to the first higher value plus one to provide a fifth result of comparison by judging whether the first lower value is less than, equal to, or greater than the second lower value; (F) comparing the lower n bits of the first exponent part with the lower n bits of the second exponent part when the first higher value is equal to the second higher value plus one to provide a sixth result of comparison by judging whether the first lower value is less than, equal to, or greater than the second lower value; (G) producing, as the first right-shift amount, a shift amount exceeding the first predetermined natural number (G1) when the first and the second results of comparison indicate that the first higher value is less than the second higher value and that the second higher value is not equal to the first higher value plus one or (G2) when the second and the fifth results of comparison indicate that the second higher value is equal to the first higher value plus one and that the first lower value is not greater than the second lower value; (H) subtracting a first lower number represented by lower (n+1) bits of the first exponent part from a second lower number represented by the lower (n+1) bits of the first exponent part (H1) when the second and the fifth results of comparison indicate that the second higher value is equal to the first higher value plus one and that the first lower value is greater than the second lower value or (H2) when the first and the fourth results of comparison indicate that the first higher value is equal to the second higher value and that the first lower value is less than the second lower value to produce, as the first right-shift amount, a firs result of subtraction; (I) producing, as the first right-shift amount, a shift amount of zero (I1) when the first result of comparison indicates that the first higher value is greater than the second higher value or (I2) when the first and the fourth results of comparison indicate that the first higher value is equal to the second higher value and that the first lower value is not less than the second lower value; (J) producing, as the second right-shift amount, a shift amount of zero (J1) when the first result of comparison indicates that the first higher value is less than the second higher value or (J2) when the first and the fourth results of comparison indicate that the first higher value is equal to the second higher value and that the first lower value is not greater than the second lower value; (K) subtracting the second lower number from the first lower number (K1) when the third and the sixth results of comparison indicate that the first higher value is equal to the second higher value plus one and that the first lower value is less than the second lower value or (K2) when the first and the fourth results of comparison indicate that the first higher value is equal to the second higher value and that the first lower value is greater than the second lower value to produce, as the second right-shift amount, a second result of subtraction; and (L) producing, as the second right-shift amount, the shift amount exceeding the first predetermined natural number (L1) when the first and the third results of comparison indicate that the first higher value is greater than the second higher value and that the first higher value is not equal to the second higher value plus one or (L2) when the third and the sixth results of comparison indicate that the first higher value is equal to the second higher value plus one and that the first lower value is not less than the second lower value.

Instead of the steps (G) and (H), the afore-understood method may comprise the steps of (Ga) producing, as the first right-shift amount, a shift amount exceeding the first predetermined natural number (Ga1) when the first and the second results of comparison indicate that the first higher value is less than the second higher value and that the second higher value is not equal to the first higher value plus one or (Ga2) when the second and the fifth results of comparison indicate that the second higher value is equal to the first higher value plus one and that the first lower value is less than the second lower value; and (Ha) subtracting a first lower number represented by lower (n+1) bits of the first exponent part from a second lower number represented by the lower (n+1) bits of the first exponent part (Ha1) when the second and the fifth results of comparison indicate that the second higher value is equal to the first higher value plus one and that the first lower value is not less than the second lower value or (Ha2) when the first and the fourth results of comparison indicate that the first higher value is equal to the second higher value and that the that the first lower value is not less than the second lower value of (Ha2) when the first and the fourth results of comparison indicate that the first higher value is equal to the second higher value and that the first lower value is less than the second lower value to produce, as the first right-shift amount, a first result of subtraction.

Instead of the steps (K) and (L), the above-understood method may comprise the steps of (Ka) subtracting the second lower number from the first lower number (Ka1) when the third and the sixth results of comparison indicate that the first higher value is equal to the second higher value plus one and that the first lower value is not greater than the second lower value or (Ka2) when the first and the fourth results of comparison indicate that the first higher value is equal to the second higher value and that the first lower value is greater than the second lower value to produce, as the second right-shift amount, a second result of subtraction; and (La) producing, as the second right-shift amount, the shift amount exceeding the first predetermined natural number (La1) when the first and the third results of comparison indicate that the first higher value is greater than the second higher value and that the first higher value is not equal to the second higher value plus one or (La2) when the third and the sixth results of comparison indicate that the first higher value is equal to the second higher value plus one and that the first lower value is greater than the second lower value.

Instead of the steps (H) and (I), the afore-understood method may comprise the steps of (Hb) subtracting a first lower number represented by lower (n+1) bits of the first exponent part from a second lower number represented by the lower (n+1) bits of the first exponent part (Hb1) when the second and the fifth results of comparison indicate that the second higher value is equal to the first higher value plus one and that the first lower value is greater than the second lower value or (Hb2) when the first and the fourth results of comparison indicate that the first higher value is equal to the second higher value and that the first lower value is not greater than the second lower value to produce, as the first right-shift amount, a first result of subtraction; and (Ia) producing, as the first right-shift amount, a shift amount of zero (Ia1) when the first result of comparison indicates that the first higher value is greater than the second higher value or (Ia2) when the first and the fourth results of comparison indicate that the first higher value is equal to the second higher value and that the first lower value is greater than the second lower value.

Instead of the steps (J) and (K), the above-understood method may comprise the steps of (Ja) producing, as the second right-shift amount, a shift amount of zero (Ja1) when the first result of comparison indicates that the first higher value is less than the second higher value or (Ja2) when the first and the fourth results of comparison indicate that the first higher value is equal to the second higher value and that the first lower value is less than the second lower value; and (Kb) subtracting the second lower number from the first lower number (Kb1) when the third and the sixth results of comparison indicate that the first higher value is equal to the second higher value plus one and that the first lower value is less than the second lower value or (Kb2) when the first and the fourth results of comparison indicate that the first higher value is equal to the second higher value and that the first lower value is not less than the second lower value to produce, as the second right-shift amount, a second result of subtraction.

Instead of the steps (G), (H), and (I), the afore-understood method may comprise the steps of (Ga) producing, as the first right-shift amount, a shift amount exceeding the first predetermined natural number (Ga1) when the first and the second results of comparison indicate that the first higher value is less than the second higher value and that the second higher value is not equal to the first higher value plus one or (Ga2) when the second and the fifth results of comparison indicate that the second higher value is equal to the first higher value plus one and that the first lower value is less than the second lower value; (Hc) subtracting a first lower number represented by lower (n+1) bits of the first exponent part from a second lower number represented by the lower (n+1) bits of the first exponent part (Hc1) when the second and the fifth results of comparison indicate that the second higher value is equal to the first higher value plus one and that the first lower value is not less than the second lower value or (Hc2) when the first and the fourth results of comparison indicate that the first higher value is equal to the second higher value and that the first lower value is not greater than the second lower value to produce, as the first right-shift amount, a first result of subtraction; and (Ia) producing, as the fist right-shift amount, a shift amount of zero (Ia1) when the first result of comparison indicates that the first higher value is greater than the second higher value or (Ia2) when the first and the fourth results of comparison indicate that the first higher value is equal to the second higher value and that the first lower value is greater than the second lower value.

Instead of the steps (J), (K), and (L), the above-understood method may comprise the steps of (Ja) producing, as the second right-shift amount, a shift amount of zero (Ja1) when the first result of comparison indicates that the first higher value is less than the second higher value or (Ja2) when the first and the fourth results of comparison indicate that the first higher value is equal to the second higher value and that the first lower value is less than the second lower value; (Kc) subtracting the second lower number from the first lower number (Kc1) when the third and the sixth results of comparison indicate that the first higher value is equal to the second higher value plus one and that the first lower value is not greater than the second lower value or (Kc2) when the first and the fourth results of comparison indicate that the first higher value is equal to the second higher value and that the first lower value is not less than the second lower value to produce, as the second right-shift amount, a second result of subtraction; and (La) producing, as the second right-shift amount, the shift amount exceeding the first predetermined natural number (La1) when the first and the third results of comparison indicate that the first higher value is greater than the second higher value and that the first higher value is not equal to the second higher value plus one or (La2) when the third and the sixth results of comparison indicate that the first higher value is equal to the second higher value plus one and that the first lower value is greater than the second lower value.

DESCRIPTION OF THE PREFERRED EMBODIMENTS

Figure 1:
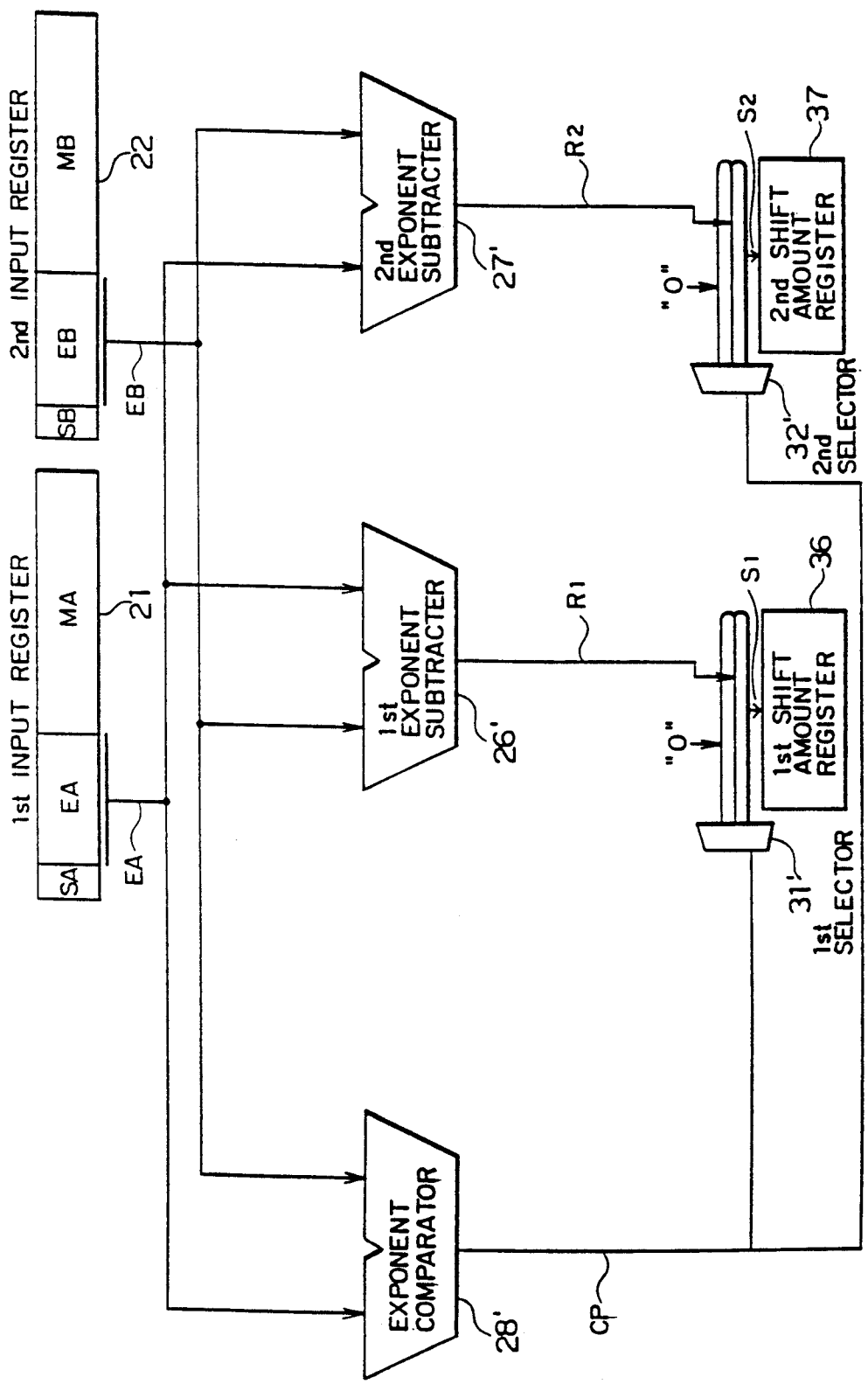
FIG. 1 is a block diagram of a conventional shift amount calculating circuit.

Referring to FIG. 1, a conventional shift amount calculating circuit will be described in order to facilitate an understanding of this invention. The shift amount calculating circuit is for use in a floating-point arithmetic unit which performs floating-point arithmetic of first and second input data A and B. Each of the first and the second input data A and B is represented by a floating-point representation. The floating-point arithmetic may be floating-point addition, floating-point subtraction, or the like.

The first input data A is composed of first sign part SA, first exponent part EA, and first mantissa part MA. Similarly, the second input data B is composed of second sign part SB, second exponent part EB, and second mantissa part MB. Each of the first and the second sign parts SA and SB is one bit long. Each of the first and the second mantissa parts MA and MB is N bits long, where N represents a first predetermined natural number which is greater than $2^{n-1}$ and is not greater than $2^n$, namely:

$$2^{n-1} < N \leq 2^n,$$

where n represents a predetermined positive integer. That is, each of the first and the second mantissa parts MA and MB has N bits arranged from a most significant bit to a least significant bit. Each of the first and the second mantissa parts MA and MB is specified by a bit number in a floating-point representation. Each of the first and the second exponent parts EA and EB is M bits long, where M represents a second predetermined natural number which is greater than the predetermined positive integer n plus one, namely:

$$M > (n+1).$$

Each of the first and the second exponent parts EA and EB is represented by an exponent number to power of two.

Figure 2:
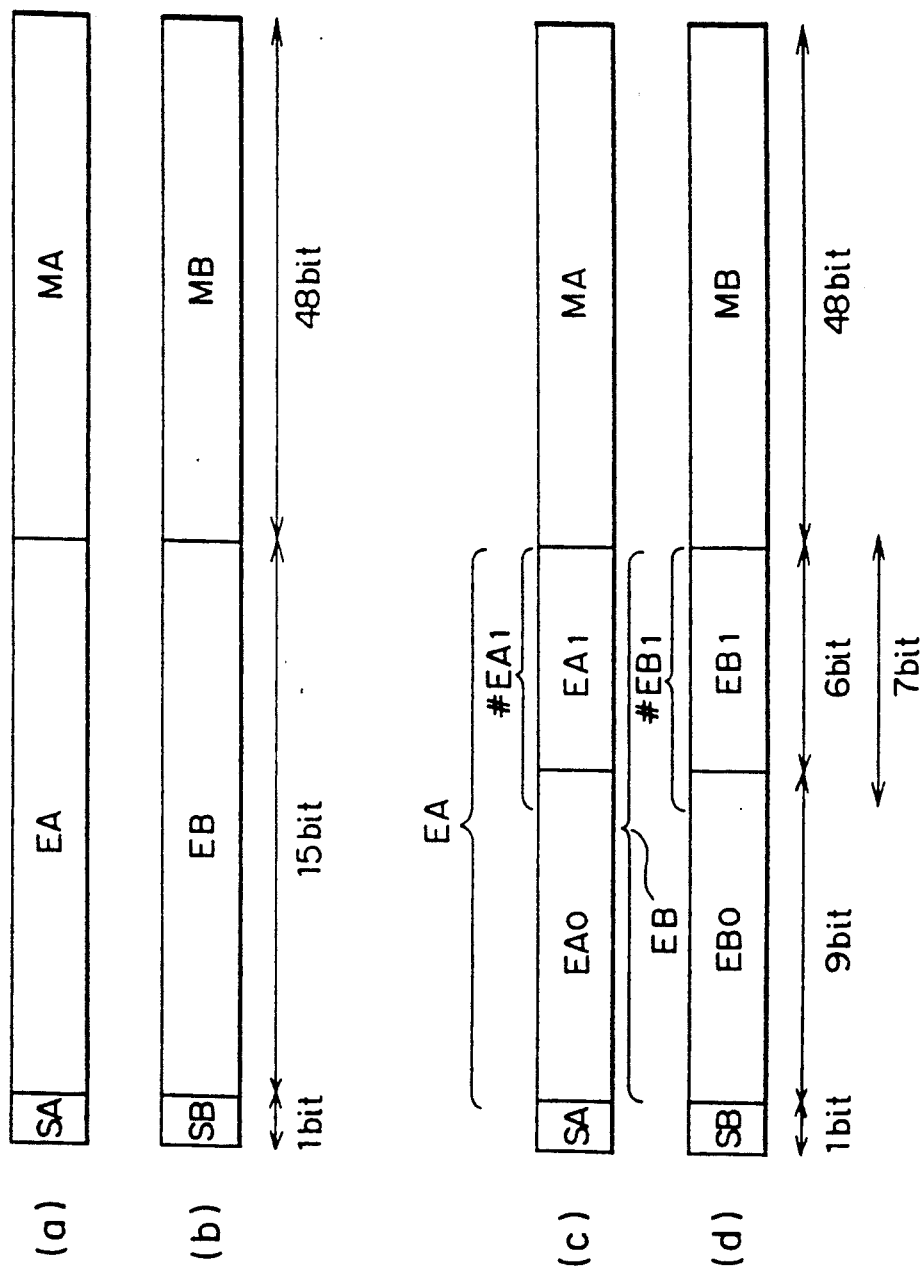
FIG. 2 consisting of lines (a) through (d) collectively show input data supplied to a shift amount calculating circuit in general.

FIGS. 2(a) and (b) show an example of the first and the second input data A and B. The first and the second input data A and B are substantially similar to those used in a shift amount calculating circuit according to this invention.

In the example being illustrated, the first predetermined natural number N is equal to forty-eight. The second predetermined natural number M is equal to fifteen. The predetermined positive integer n is equal to six. More specifically, the first input data A is composed of the first sign part SA of one bit long, the first exponent part EA of fifteen bits long, and the first mantissa part MA of forty-eight bits long, as shown in FIG. 2(a). Likewise, the second input data B is composed of the second sign part SB of one bit long, the second exponent part EB of fifteen bits long, and the second mantissa part MB of forty-eight bits long, as shown in FIG. 2(b). Each of the first and the second exponent parts EA and EB represents an integer in two's-complement form. Each of the first and the second mantissa parts MA and MB represents a fraction in sign absolute value form.

As well known in the art, the floating-point arithmetic unit includes an adder/subtracter (not shown) for the first and the second mantissa parts MA and MB. For the example being illustrated, the adder/subtracter is operable for use in a guard digit of sixteen bits. That is, the adder/subtracter carries out addition/subtraction operation down to sixty-four bits below the decimal place.

In general, the floating points of the first and the second mantissa parts MA and MB are equalized or decimally aligned on performing the floating-point addition/subtraction. For this purpose, the floating-point arithmetic unit includes the shift amount calculating circuit for calculating a shift amount required for such equalization or alignment by decimal point. The shift amount consists of first and second right-shift amounts for use in rightwards shifting or shifting towards the least significant bit the first and the second mantissa parts MA and MB, respectively.

Turning back to FIG. 1, the conventional shift amount calculating circuit comprises first and second input registers 21 and 22, first and second exponent subtracters 26' and 27', an exponent comparator 28', first and second selectors 31' and 32', and first and second shift amount registers 36 and 37.

The first and the second input data A and B are held in the first and the second input registers 21 and 22, respectively. Each of the first and the second exponent subtracters 26' and 27' is supplied with all M bits of the first and the second exponent parts EA and EB from the first and the second input registers 21 and 22. The M bits of the first exponent part EA are representative of a first number which is denoted at EA. The M bits of the second exponent part EB represent a second number which is denoted at EB. The first exponent subtracter 26' subtracts the first number EA from the second number EB to produce a first difference signal R1 representative of a first result of subtraction. The second exponent subtracter 27' subtracts the second number EB from the first number EA to produce a second difference signal R2 representative of a second result of subtraction. Each of the first and the second difference signals R1 and R2 is sixteen bits long.

The exponent comparator 28' is also supplied with all M bits of the first and the second exponent parts EA and Eb. The exponent comparator 28' compares the M bits of the first exponent part EA with the M bits of the second exponent part EB to produce a comparison result signal CP indicative of a result of comparison. More particularly, the comparison result signal CP has two bits which are denoted by S and T. Each of the two bits S and T has one of logic zero and one values. The two bits S and T are collectively called a bit pair which is denoted by (S, T). The bit pair (S, T) represents one of (0, 0), (0, 1), and (1, 0). When the first number EA is equal to the second number EB, namely:

EA=EB, the exponent comparator 28' produces, as the comparison result signal CP, the bit pair (S, T) equal to (0, 0), namely:

(S, T)=(0, 0).

When the first number EA is greater than the second number EB, namely:

EA>EB, the exponent comparator 28' produces, as the comparison result signal CP, the bit pair (S, T) equal to (0, 1), namely:

(S, T)=(0, 1).

When the first number EA is less than the second number EB, namely, EA<EB, the exponent comparator 28' produces, as the comparison result signal CP, the bit pair (S, T) equal to (1, 0), namely:

(S, T)=(1, 0).

The first selector 31' is connected to the first exponent subtracter 26' and the exponent comparator 28'. The first selector 31' is supplied with a value signal "0" indicative of a shift amount of zero. Responsive to the comparison result signal CP, the first selector 31' selects one of the first difference signal R1 and the value signal "0" to produce a first selected signal S1. More specifically, the first selector 31' selects, as the first selected signal S1, the value signal "0" when the bit S of the comparison result signal CP has the logic zero value, namely:

S=0.

The first selector 31' selects, as the first selected signal S1, the first difference signal R1 when the bit T of the comparison result signal CP has the logic zero value, namely:ps
T=0.

It is to be noted that the first difference signal R1 is equal to the value signal "0" when both of the bits S and T have the logic zero values, namely:

S=T=0.

The second selector 32' is connected to the second exponent subtracter 27' and the exponent comparator 28'. The second selector 32' is supplied with the value signal "0". Responsive to the comparison result signal CP, the second selector 32' selects one of the second difference signal R2 and the value signal "0" to produce a second selected signal S2. More particularly, the second selector 32' selects, as the second selected signal S2, the value signal "0" when the bit T of the comparison result signal CF has the logic zero value, namely:

T=0.

The second selector 32' selects, as the second selected signal S2, the second difference signal R2 when the bit S of the comparison result signal CP has the logic zero value, namely:

S=0.

It is to be noted that the second difference signal R2 is equal to the value signal "0" when both of the bits S and T have the logic zero values, namely:

S=T=0.

The first and the second shift amount registers 36 and 37 are connected to the first and the second selectors 31' and 32', respectively. The first shift amount register 36 holds the first selected signal S1 as a first held signal to produce the first held signal as a first right-shift amount signal indicative of the first right-shift amount. The second register 37 holds the second selected signal S2 and a second held signal to produce the second held signal as a second right-shift amount signal indicative of the second right-shift amount.

It is to be noted that, in the conventional shift amount calculating circuit, each of the first and the second exponent subtracters 26' and 27' must carry out subtraction operation on all M bits of the first and the second exponent parts Ea and Eb. As a result, the conventional shift amount calculating circuit is disadvantageous in that each of the first and the second exponent subtracters 26' and 27' has a large amount of hardware and consumes much of its time in subtraction, as mentioned in the preamble of the instant specification.

Figure 3:
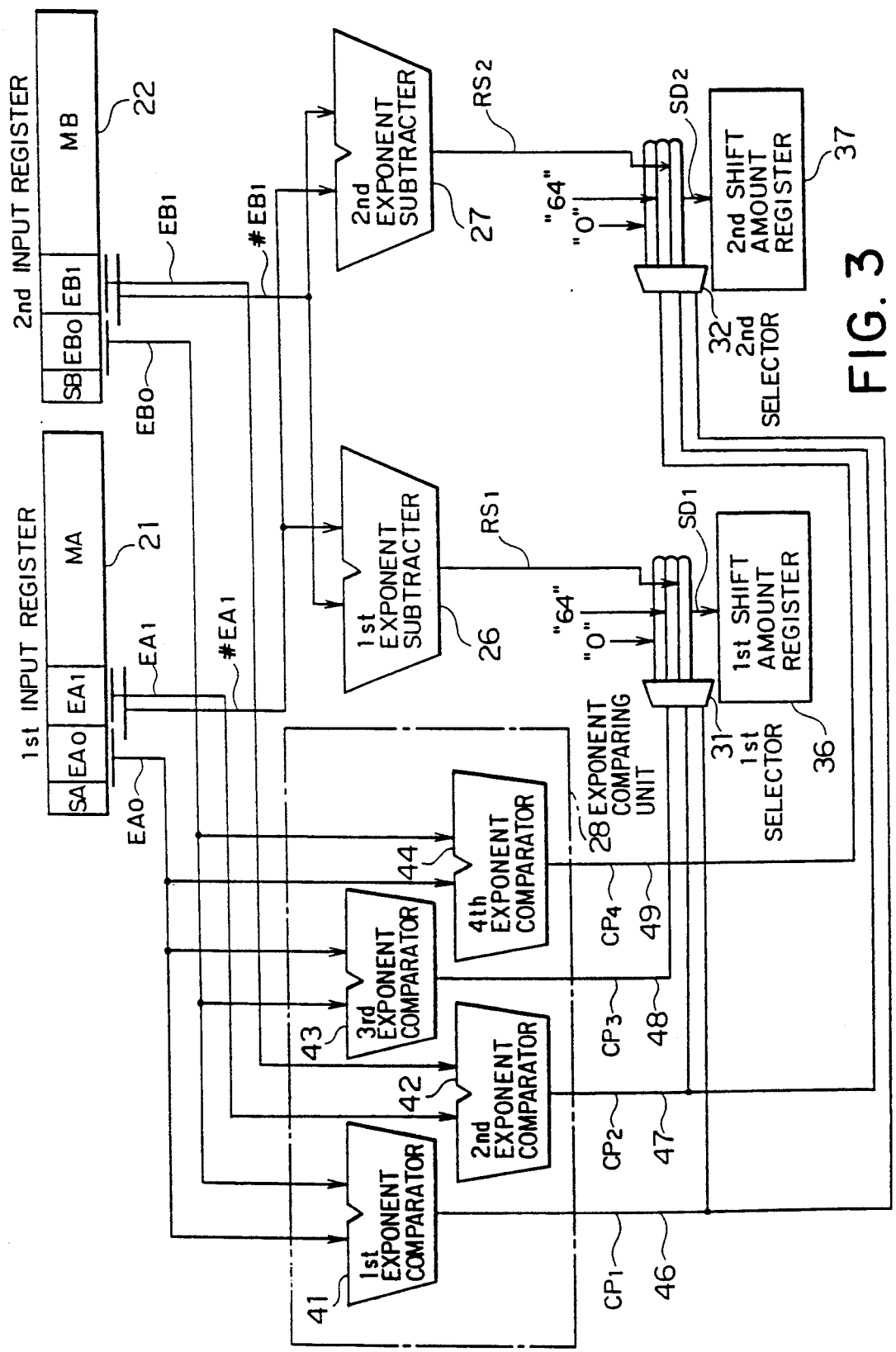
FIG. 3 is a block diagram of a shift amount calculating circuit according to an embodiment of this invention.

Referring to FIG. 3, a shift amount calculating circuit according to an embodiment of this invention is similar in structure to that illustrated in FIG. 1 except that the first and the second exponent subtracters and the first and the second selectors are modified to be different from those described in conjunction with FIG. 1 and that the shift amount calculating circuit comprises an exponent comparing unit according to this invention instead of the exponent comparator 28' illustrated in FIG. 1 as will later become clear. The first and the second exponent subtracters and the first and the second selectors are therefore depicted at 26, 27, 31, and 32, respectively. In addition, the exponent comparing unit is depicted at 28.

Temporarily referring to FIGS. 2(c) and (d), each of the first and the second exponent parts EA and EB consists of lower n or six bits and higher $(M-n)$ or nine bits. The lower six bits of the first and the second exponent parts EA and EB represent first and second lower values EA1 and EB1, respectively. The higher nine bits of the first and the second exponent parts EA and EB represent first and second higher values EA0 and EB0, respectively. In addition, each of the first and the second exponent parts EA and EB has lower $(n+1)$ or seven bits. The lower seven bits of the first and the second exponent parts EA and EB represent first and second lower numbers #EA1 and #EB1, respectively.

Turning back to FIG. 3, each of the first and the second exponent subtracters 26 and 27 is supplied with the lower seven bits of the first and the second exponent parts EA and EB from the first and the second input registers 21 and 22. The first exponent subtracters 26 subtracts the first lower number #EA1 from the second lower number #EB1 to produce a first difference signal RS1 indicative of a first result of subtraction. The second exponent subtracter 27 subtracts the second lower number #EB1 from the first lower number #EA1 to produce a second difference signal RS2 indicative of a second result of subtraction.

The exponent comparing unit 28 is supplied with the first and the second exponent parts EA and EB. The exponent comparing unit 28 compares the first exponent part EA with the second exponent part EB to produce a comparison result signal indicative of a result of comparison. More specifically, the exponent comparing unit 28 comprises first through fourth exponent comparators 41, 42, 43, and 44.

The first exponent comparator 41 is supplied with the higher nine bits of the first and the second exponent parts EA and EB. The first exponent comparator 41 compares the higher nine bits of the first exponent part EA with the higher nine bits of the second exponent part EB to produce a first compared signal CP1 of a first result of comparison. The first result of comparison represents whether the first higher value EA0 is greater than, equal to, or less than the second higher value EB0. More particularly, the first compared signal CP1 has two bits which are denoted by $S_0$ and $T_0$. Each of the two bits S0 and T0 has one of logic zero and one values. The two bits S and T0 are collectively referred to as a first bit pair which is denoted by $(S_0, T_0)$ The first bit pair $(S_0, T_0)$ represents one of (0, 0), (0, 1), and (1, 0). When the first higher value EA0 is equal to the second higher value EB0, namely:

EA0=EB0, the first exponent comparator 41 produces, as the first compared signal CP1, the first bit pair $(S_0, T_0)$ equal to (0, 0), namely:

$(S_0, T_0) = (0, 0)$.

When the first higher value EA0 is greater than the second higher value EB0, namely:

EA0>EB0, the first exponent comparator 41 produces, as the first compared signal CP1, the first bit pair $(S_0, T_0)$ equal to (0, 1), namely:

$(S_0, T_0) = (0, 1)$.

When the first higher value EA0 is less than the second higher value EB0, namely:

EA0<EB0, the first exponent comparator 41 produces, as the first compared signal CP1, the first bit pair $(S_0, T_0)$ equal to (1, 0), namely:

$(S_0, T_0) = (1, 0)$.

The second comparator 42 is supplied with the lower six bits of the first and the second exponent parts EA and EB. The second comparator 42 compares the lower six bits of the first exponent part EA with the lower six bits of the second exponent part EB to produce a second compared signal CP2 of a second result of comparison. The second result of comparison represents whether the first lower value EA1 is greater than, equal to, or less than the second lower value EB1. More specifically, the second compared signal CP2 has two bits which are denoted by $S_1$ and $T_1$. Each of the two bits $S_1$ and $T_1$ has one of logic zero and one values. The two bits $S_1$ and $T_1$ are collectively called a second bit pair which is denoted by $(S_1, T_1)$ The second bit pair $(S_1, T_1)$ represent one of (0, 0), (0, 1), and (1, 0). When the first lower value EA1 is equal to the second lower value EB1, namely:

EA1=EB1, the second exponent comparator 42 produces, as the second compared signal CP2, the second bit pair $(S_1, T_1)$ equal to (0, 0), namely:

$(S_1, T_1) = (0, 0)$.

When the first lower value EA1 is greater than the second lower value EB1, namely:

EA1>EB1, the second exponent comparator 42 produces, as the second compared signal CP2, the second bit pair ($S_1$, $T_1$) equal to (0, 1), namely:

($S_1$, $T_1$)=(0, 1).

When the first lower value EA1 is less than the second lower value EB1, namely:

EA1<EB1, the second exponent comparator 42 produces, as the second compared signal CP2, the second bit pair ($S_1$, $T_1$) equal to (1, 0), namely:

($S_1$, $T_1$)=(1, 0).

The third comparator 43 is supplied with the higher nine bits of the first and the second exponent parts EA and EB. The third comparator 43 compares the higher nine bits of the first exponent part EA with the higher nine bits of the second exponent part EB to produce a third compared result signal CP3 of a third result of comparison. The third result of comparison represents whether or not the second higher value EB0 is equal to the first higher value EA0 plus one, namely:

EA0+1=EB0.

More particularly, the third compared signal CP3 has one bit which is denoted by $P_0$. The one bit $P_0$ has one of logic zero and one values. The one bit $P_0$ is referred to as a third bit. When the second higher value EB0 is equal to the first higher value EA0 plus one, namely:

EA0+1=EB0, the third exponent comparator 43 produces, as the third compared signal CP3, the third bit $P_0$ equal to the logic one value, namely:

$P_0$=1.

When the second higher value EB0 is not equal to the first higher value EA0 plus one, namely:

EA0+1≠EB0, the third exponent comparator 43 produces, as the third compared signal CP3, the third bit $P_0$ equal to the logic zero value, namely:

$P_0$=0.

The fourth comparator 44 is supplied with the higher nine bits of the first and the second exponent parts EA and EB. The fourth comparator 44 compares the higher nine bits of the first exponent part EA with the higher nine bits of the second exponent part EB to produce a fourth compared signal CP4 of a fourth result of comparison. The fourth result of comparison represents whether or not the first higher value EA0 is equal to the second higher value EB0 plus one, namely:

EB0+1=EA0.

More specifically, the fourth compared signal CP4 has one bit which is denoted by $P_1$. The one bit $P_1$ has one of logic zero and one values. The one bit $P_1$ is called a fourth bit, when the first higher value EA0 is equal to the second higher value EB0 plus one, namely:

EB0+1=EA0, the fourth exponent comparator 44 produces, as the fourth compared signal CP4, the fourth bit $P_1$ equal to the logic one value, namely:

$P_1$=1.

When the first higher value EA0 is not equal to the second higher value EB0 plus one, namely:

EB0+1≠EA0, the fourth exponent comparator 44 produces, as the fourth compared signal CP4, the fourth bit $P_1$ equal to the logic zero value, namely:

$P_1$=0.

The exponent comparing unit 28 is connected to the first and the second selectors 31 and 32 via first through fourth signal lines 46, 47, 48, and 49. The first through the fourth compared signals $CP_1$ to CP4 are supplied to the first and the second selectors 31 and 32 via the first through the fourth signal lines 46 to 49. Therefore, the first through the fourth signal lines 46 to 49 serves as a supplying arrangement for collectively supplying, as the comparison result signal, the first through the fourth compared signals CP1 to CP4 to the first and the second selectors 31 and 32. More particularly, the first through the third compared signals $CP_1$ to CP3 are supplied to the first selectors 31 via the first through the third signal lines 46 to 48. The first, the second, and the fourth compared signals CP1, CP2, and CP4 are supplied to the second selector 32 via the first, the second, and the fourth signal lines 46, 47, and 49.

The first selector 31 is connected to the first subtracter 26. The first selector 31 is supplied with a first value signal "0" indicative of a shift amount of zero and a second value signal "64" indicative of a shift amount greater than the first predetermined natural number N or forty-eight. Each of the first and the second value signals "0" and "64" is represented by seven bits. More particularly, the first value signal "0" is represented by binary 000 0000. The second value signal "64" is represented by binary 100 0000. Responsive to the comparison result signal, the first selector 31 selects one of the first difference signal RS1 and the first and the second value signals "0" and "64" to produce a first selected signal SD1 as a first right-shift amount signal indicative of the first right-shift amount, in the manner which will later be described.

The second selector 32 is connected to the second subtracter 27. The second selector 32 is supplied with the first and the second value signals "0" and "64". Responsive to the comparison result signal, the second selector 32 selects one of the second difference signal RS2 and the first and the second value signals "0" and "64" to produce a first selected signal SD2 as a second right-shift amount signal indicative of the second right-shift amount, in the manner which will later be described.

The first register 36 is connected to the first selector 31. The first register 36 holds the first selected signal SD1 as a first held signal. The first register 36 produces the first held signal as the first right-shift amount signal. The second register 37 is connected to the second selector 32. The second register 37 holds the second selected signal as a second held signal. The second register 37 produces the second held signal as the second right-shift amount signal.

Figure 4:
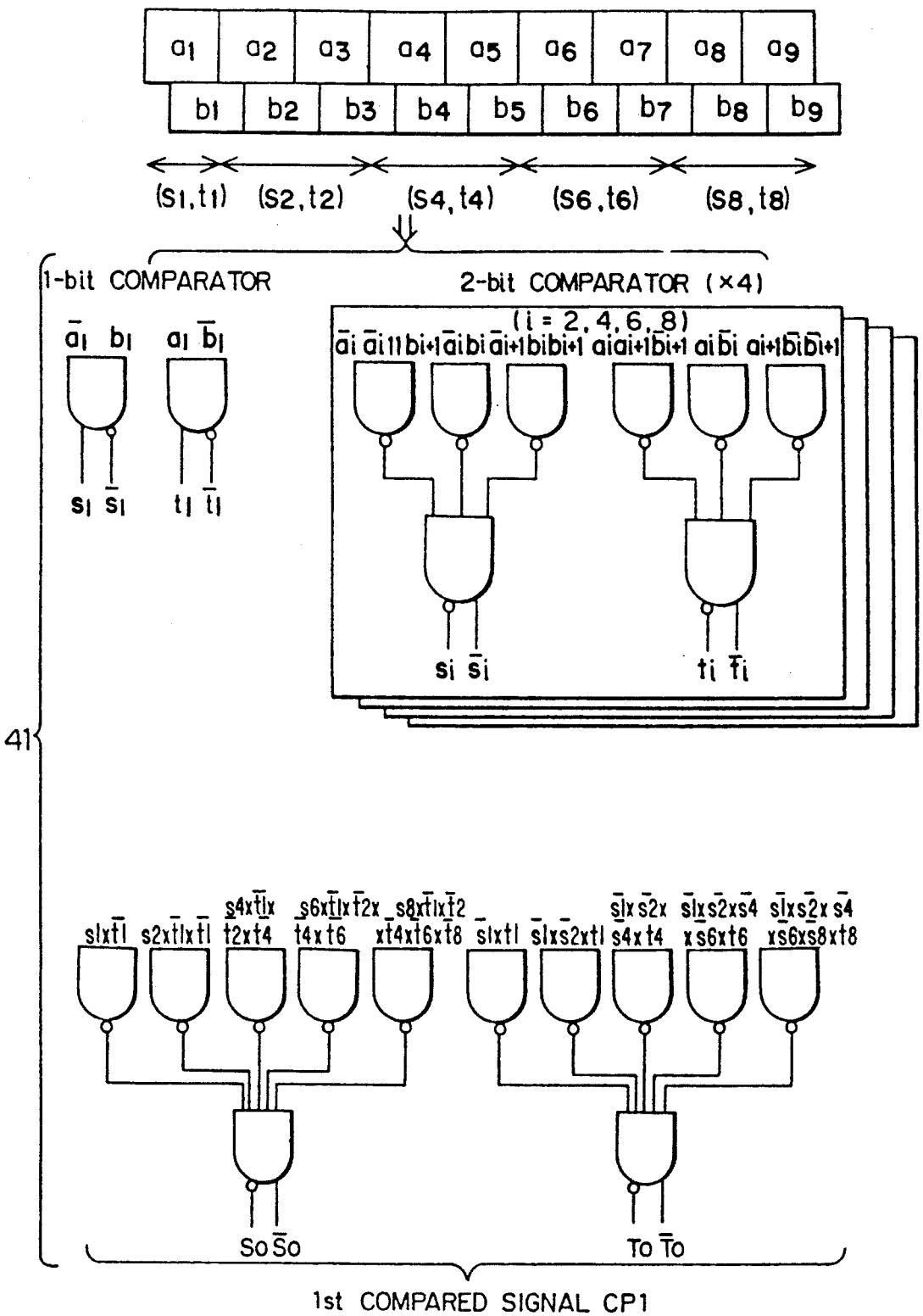
FIG. 4 is a block diagram of a first exponent comparator for use in the shift amount calculating circuit illustrated in FIG. 3.
Figure 5:
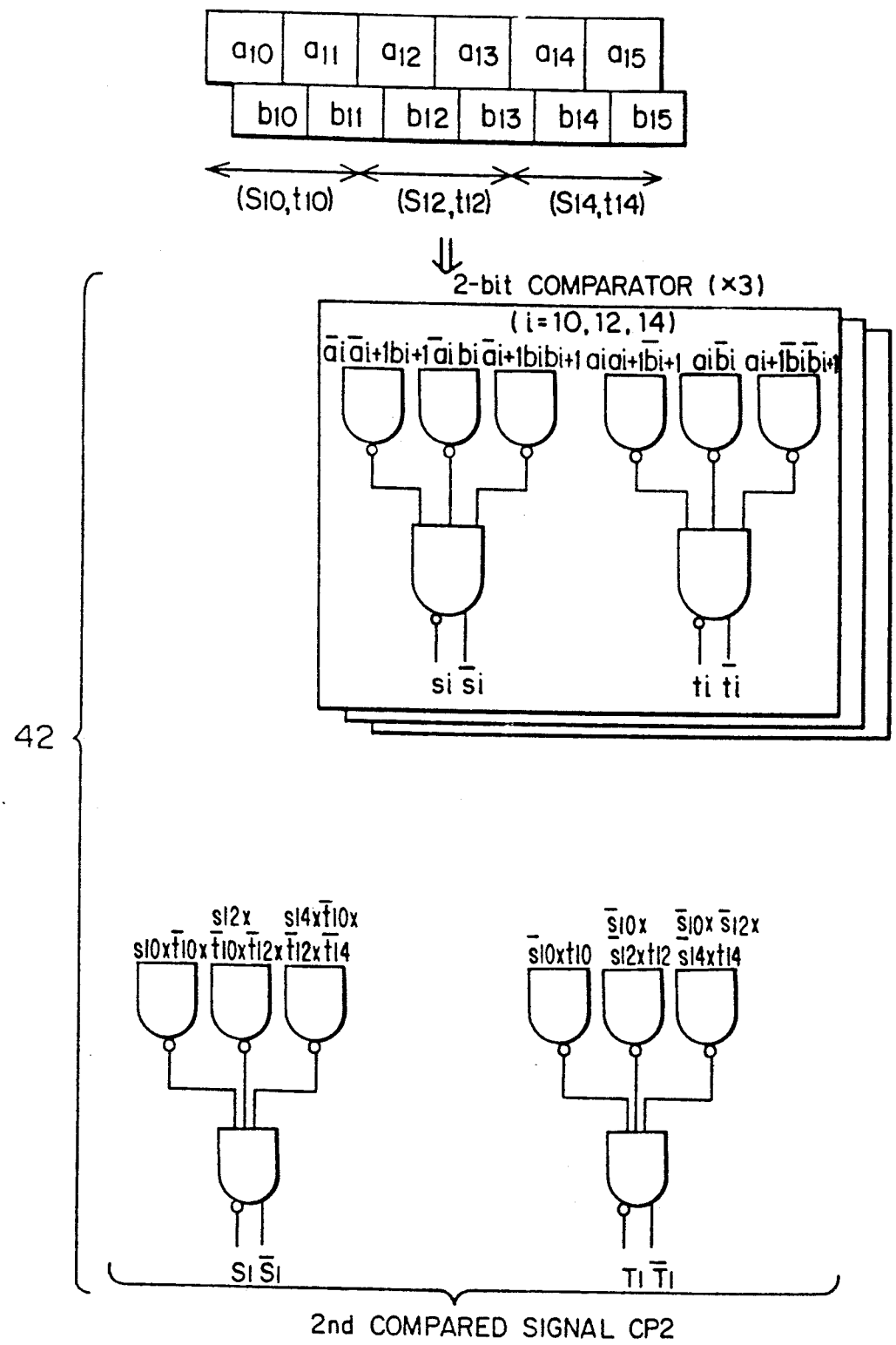
FIG. 5 is a block diagram of a second exponent comparator for use in the shift amount calculating circuit illustrated in FIG. 3.

Turning to FIGS. 4 and 5, the description will proceed to the first and the second exponent comparators 41 and 42. It is presumed that the first and the second exponent parts EA and Eb are represented by:

$$EA = a_1, a_2, a_3, a_4, a_{54}, a_6, a_7, a_8, a_9, a_{10}, a_{11}, a_{12}, a_{13}, a_{14}, a_{15},$$

and $$EB = b_1, b_2, b_3, b_4, b_5, b_6, b_7, b_8, b_9, b_{10}, b_{11}, b_{12}, b_{13}, b_{14}, b_{15}.$$

For comparison by the first and the second exponent comparators 41 and 42, bits $s_1$, $s_2$, $s_4$, $s_6$, $s_8$, $s_{10}$, $s_{12}$, and $s_{14}$ and bits $t_1$, $t_2$, $t_4$, $t_6$, $t_8$, $t_{10}$, $t_{12}$, and $t_{14}$ are calculated by Boolean expressions:

$$s_1 = a_1 \times \overline{b_1},$$

$$t_1 = \overline{a_1} \times b_1,$$

$$s_i = \overline{a_1} \times b_i + \overline{a_i} \times \overline{a_{i+1}} \times b_{i+1} + \overline{a_{i+1}} \times b_i \times b_{i+1},\text{ and}$$

$$t_i = a_i \times \overline{b_i} + a_{i+1} \times \overline{b_i} \times \overline{b_{i+1}} + a_i \times a_{i+1} \times \overline{b_{i+1}},$$

where i represents a first variable which is selected from two, four, six, eight, ten, twelve, and fourteen, the symbol x represents an AND operator, and the symbol + represents an OR operator. Under the circumstances, the two bits $S_0$ and $T_0$ of the first compared signal CP1 and the two bits $S_1$ and $T_1$ of the second compared signal CP2 are given by different Boolean expressions:

$$S_0 = s_1 \times \overline{t_1} + s_2 \times \overline{t_1} \times \overline{t_2} +$$
$$s_4 \times \overline{t_1} \times \overline{t_2} \times \overline{t_4} + s_6 \times \overline{t_1} \times \overline{t_2} \times \overline{t_4} \times \overline{t_6} +$$
$$s_8 \times \overline{t_1} \times \overline{t_2} \times \overline{t_4} \times \overline{t_6} \times \overline{t_8},$$

$$T_0 = \overline{s_1} \times t_1 + \overline{s_1} \times \overline{s_2} \times t_2 +$$
$$\overline{s_1} \times \overline{s_2} \times \overline{s_4} \times t_4 + \overline{s_1} \times \overline{s_2} \times \overline{s_4} \times \overline{s_6} \times t_6 +$$
$$\overline{s_1} \times \overline{s_2} \times \overline{s_4} \times \overline{s_6} \times \overline{s_8} \times t_8,$$

$$S_1 = s_{10} \times \overline{t_{10}} + s_{12} \times \overline{t_{10}} \times \overline{t_{12}} + s_{14} \times \overline{t_{10}} \times \overline{t_{12}} \times \overline{t_{14}},$$

$$T_1 = \overline{s_{10}} \times t_{10} + \overline{s_{10}} \times \overline{s_{12}} \times t_{12} + \overline{s_{10}} + \overline{s_{12}} \times \overline{s_{14}} \times t_{14}.$$

Therefore, the first and the second exponent comparators 41 and 42 are composed of a plurality of gates as shown in FIGS. 4 and 5, respectively.

Figure 6:
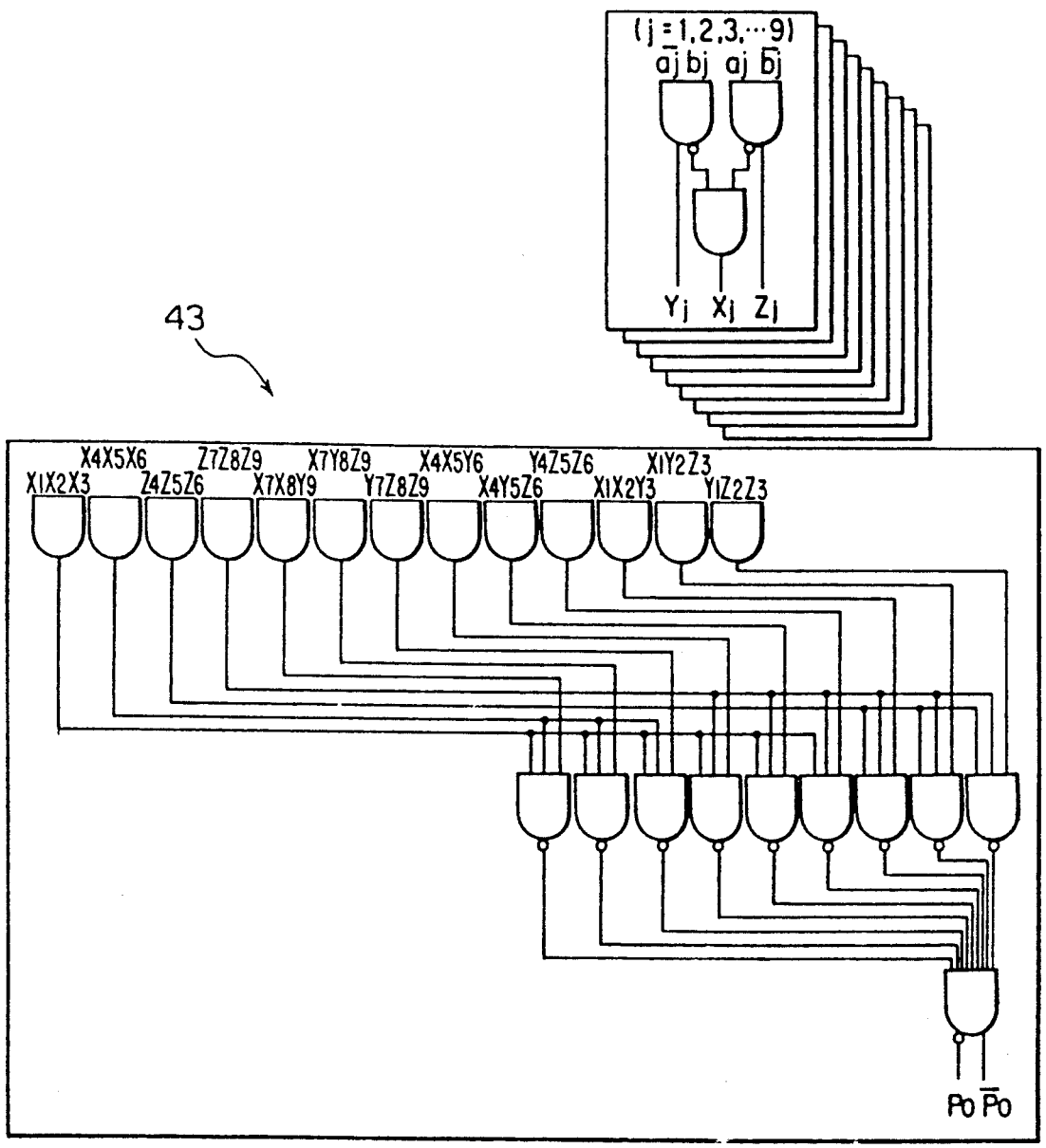
FIG. 6 is a block diagram of a third exponent comparator for use in the shift amount calculating circuit illustrated in FIG. 3.
Figure 7:
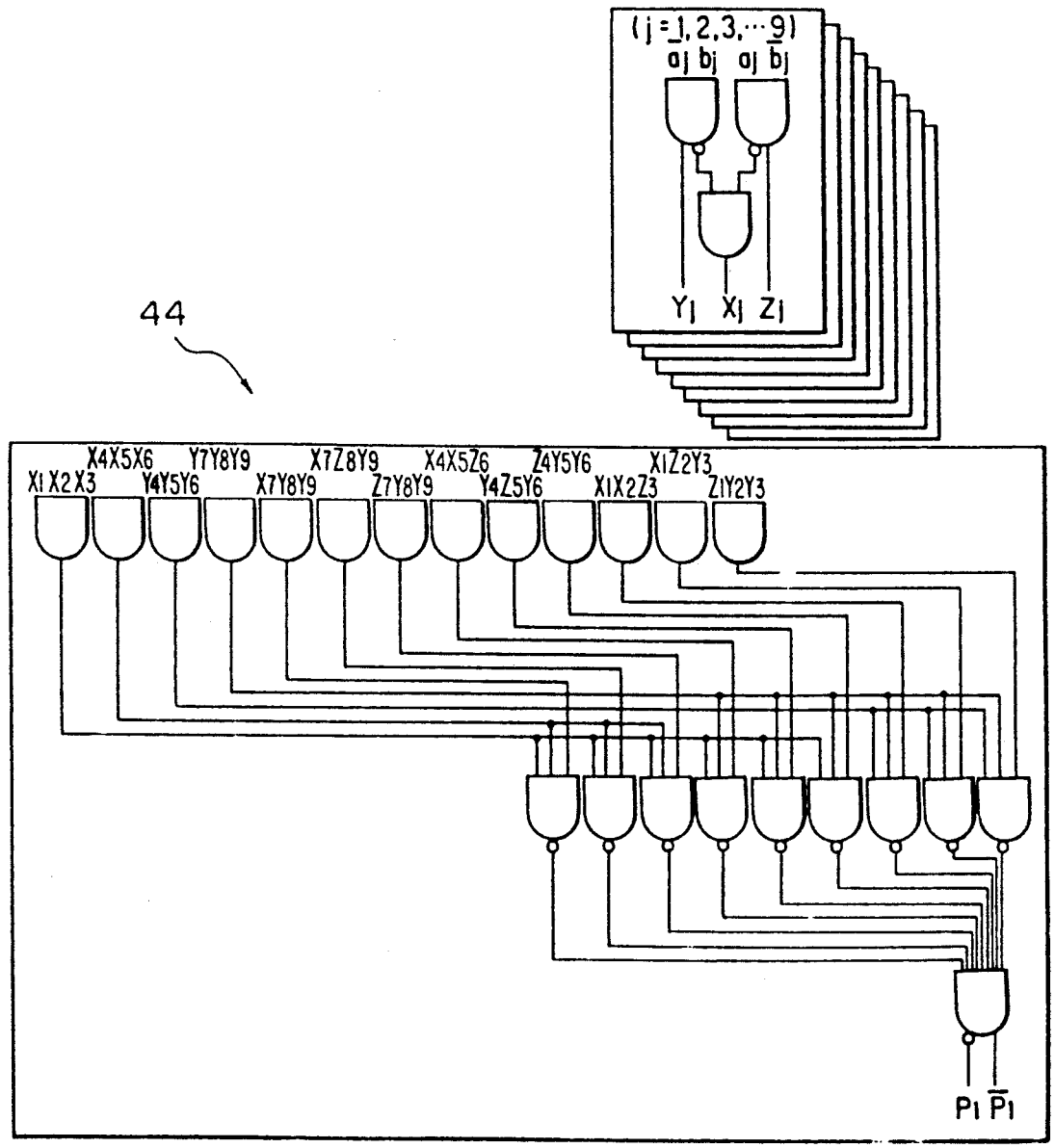
FIG. 7 is a block diagram of a fourth exponent comparator for use in the shift amount calculating circuit illustrated in FIG. 3.

Turning to FIGS. 6 and 7, the description will proceed to the third and the fourth exponent comparators 43 and 44. For comparison by the third and the fourth exponent comparators 43 and 44, bits $X_1$, $X_2$, $X_3$, $X_4$, $X_5$, $X_6$, $X_7$, $X_8$, and $X_9$, and bits $Y_1$, $Y_2$, $Y_3$, $Y_4$, $Y_5$, $Y_6$, $Y_7$, $Y_8$, and $Y_9$, and bits $Z_1$, $Z_2$, $Z_3$, $Z_4$, $Z_5$, $Z_6$, $Z_7$, $Z_8$, and $Z_9$ are calculated by Boolean expressions:

$$X_j = \overline{a_j \oplus b_j},$$

$$Y_j = \overline{a_j} \times b_j,$$

and $$Z_j = a_j \times \overline{b_j},$$

where j represents a second variable which is selected between one and nine, both inclusive, and the symbol $\oplus$ is used as an exclusive-OR operator. Under the circumstances, the bits $P_0$ of the third compared signal CP3 and the bits $P_1$ of the fourth compared signal CP4 are given by different Boolean expressions:

$$P_0 = X_1 \times X_2 \times X_3 \times X_4 \times X_5 \times X_6 \times X_7 \times X_8 \times Y_9 +$$
$$X_1 \times X_2 \times X_3 \times X_4 \times X_5 \times X_6 \times X_7 \times X_8 \times Z_9 +$$
$$X_1 \times X_2 \times X_3 \times X_4 \times X_5 \times X_6 \times Y_7 \times Z_8 \times Z_9 +$$
$$X_1 \times X_2 \times X_3 \times X_4 \times X_5 \times Y_6 \times Z_7 \times Z_8 \times Z_9 +$$
$$X_1 \times X_2 \times X_3 \times X_4 \times Y_5 \times Z_6 \times Z_7 \times Z_8 \times Z_9 +$$
$$X_1 \times X_2 \times X_3 \times Y_4 \times Z_5 \times Z_6 \times Z_7 \times Z_8 \times Z_9 +$$
$$X_1 \times X_2 \times Y_3 \times Z_4 \times Z_5 \times Z_6 \times Z_7 \times Z_8 \times Z_9 +$$
$$X_1 \times Y_2 \times Z_3 \times Z_4 \times Z_5 \times Z_6 \times Z_7 \times X_8 \times Z_9 +$$
$$Y_1 \times Z_2 \times Z_3 \times Z_4 \times Z_5 \times Z_6 \times Z_7 \times Z_8 \times Z_9$$

and $$P_1 = X_1 \times X_2 \times X_3 \times X_4 \times X_5 \times X_6 \times X_7 \times X_8 \times Z_9 +$$
$$X_1 \times X_2 \times X_3 \times X_4 \times X_5 \times X_6 \times X_7 \times Z_8 \times Y_9 +$$
$$X_1 \times X_2 \times X_3 \times X_4 \times X_5 \times X_6 \times Z_7 \times Y_8 \times Y_9 +$$
$$X_1 \times X_2 \times X_3 \times X_4 \times X_5 \times Z_6 \times Y_7 \times Y_8 \times Y_9 +$$
$$X_1 \times X_2 \times X_3 \times X_4 \times Z_5 \times Y_6 \times Y_7 \times Y_8 \times Y_9 +$$
$$X_1 \times X_2 \times X_3 \times Z_4 \times Y_5 \times Y_6 \times Y_7 \times Y_8 \times Y_9 +$$
$$X_1 \times X_2 \times Z_3 \times Y_4 \times Y_5 \times Y_6 \times Y_7 \times Y_8 \times Y_9 +$$
$$X_1 \times Z_2 \times Y_3 \times Y_4 \times Y_5 \times Y_6 \times Y_7 \times Y_8 \times Y_9 +$$
$$Z_1 \times Y_2 \times Y_3 \times Y_4 \times Y_5 \times Y_6 \times Y_7 \times Y_8 \times Y_9$$

Therefore, the third and the fourth exponent comparators and 44 are composed of a plurality of gates as shown in FIGS. 6 and 7, respectively.

Figure 8:
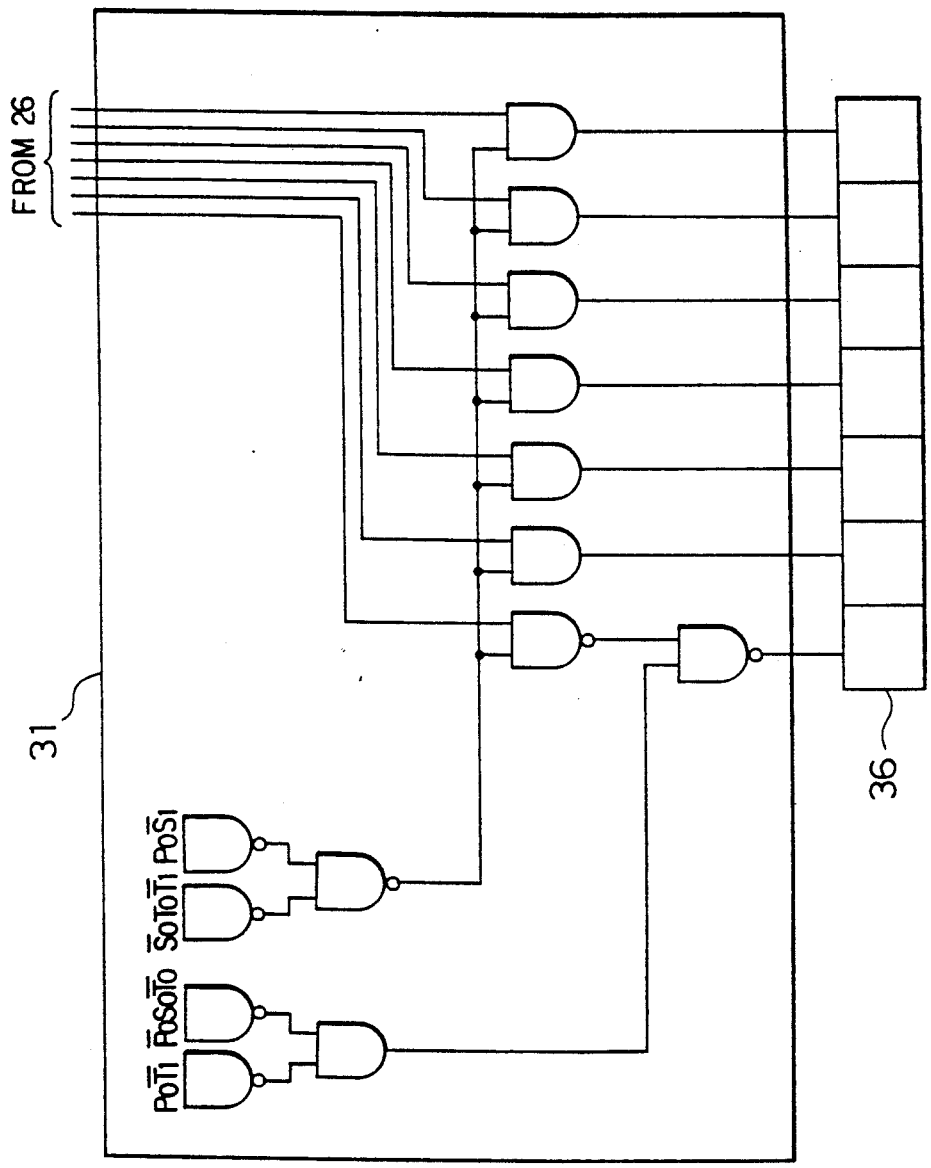
FIG. 8 is a block diagram of a first selector for use in the shift amount calculating circuit illustrated in FIG. 3.

Turning to FIG. 8, the description will proceed to the first selector 31. The first selector 31 selects the first value signal "0" as the first selected signal SD1 when the first exponent part EA is not less than the second exponent part EB, namely:

$$EA \geq EB.$$

That is, the first selector 31 selects the first value signal "0" as the first selected signal SD1 (1) when the first result of comparison indicates that the first higher value EA0 is greater than the second higher value EB0, namely:

$$EA0 > EB0,$$

or (2) when the first and the second results of comparison indicate that the first higher value EA0 is equal to the second higher value EB0, namely:

$$EA0 = EB0,$$

and that the first lower value EA1 is not less than the second lower value EB1, namely:

EA1≧EB1.

In other words, the first selector 31 selects the first value signal "0" as the first selected signal SD1 when a combination of the two bits $S_0$ and $T_0$ of the first compared signal CP1 and the bit $S_1$ of the second compared signal CP2 satisfies a Boolean expression:

$\overline{S_0} \times T_0 + \overline{S_0} \times \overline{T_0} \times \overline{S_1} = 1.$ The first selector 31 selects the first difference signal RS1 as the first selected signal SD1 (1) when the first and the second results of comparison indicate that the first higher value EA0 is equal to the second higher value EB0, namely:

EA0=EB0, and that the first lower value EA1 is not greater than the second lower value EA1, namely:

EA1≦EB1, or (2) when the third and the second results of comparison indicate that the second higher value EB0 is equal to the first higher value EA0 plus one, namely:

EA0+1=EB0, and that the first lower value EA1 is not less than the second lower value EB1, namely:

EA1≧EB1.

In other words, the first selector 31 selects the first difference signal RS1 as the first selected signal SD1 when a combination of the two bits $S_0$ and $T_0$ of the first compared signal CP1, the two bits $S_1$ and $T_1$ of the second compared signal CP2, and the bit $P_0$ of the third compared signal CP3 satisfies another Boolean expression:

$\overline{S_0} \times \overline{T_0} \times \overline{T_1} + P_0 \times \overline{S_1} = 1.$ The first selector 31 selects the second value signal "64" as the first selected signal SD1 (1) when the third and the second results of comparison indicate that the second higher value EB0 is equal to the first higher value EA0 plus one, namely:

EA0+1=EB0, and that the first lower value EA1 is not greater than the second lower value EB1, namely:

EA1≦EB1, or (2) when the third and the first results of comparison indicate that the second higher value EB0 is not equal to the first higher value EA0 plus one, namely:

EA0+1≠EB0, and that the first higher value EA0 is less than the second higher value EB0, namely:

EA0<EB0.

In other words, the first selector 31 selects the second value signal "64" as the first selected signal SD1 when a combination of the two bits $S_0$ and $T_0$ of the first compared signal CP1, the bit $T_1$ of the second compared signal CP2, and the bit $P_0$ of the third compared signal CP3 satisfies still another Boolean expression:

$P_0 \times \overline{T_1} + \overline{P_0} \times S_0 \times \overline{T_0} = 1.$ Therefore, the first selector 31 is composed of a plurality of gates as shown in FIG. 8.

In FIG. 8, the first selector 31 selects, as the first selected signal SD1, the difference signal RS1 when the first and the second results of comparison indicate that the first higher value EA0 is equal to the second higher value EB0, namely:

EA0=EB0, and that the first lower value EA1 is equal to the second lower value EB1, namely:

EA1=EB1.

The first selector 31 selects, as the first selected signal SD1, the second value signal "64" when the third and the second results of comparison indicate that the second higher value EB0 is equal to the first higher value EA0 plus one, namely:

EA0+1=EB0, and that the first lower value EA1 is equal to the second lower value EB1, namely:

EA1=EB1.

However, the first selector 31 may select, as the first selected signal SD1, the first value signal "0" instead of the first difference signal RS1 when the first and the second results of comparison indicate that the first higher value EA0 is equal to the second higher value EB0, namely:

EA0=EB0, and that the first lower value EA1 is equal to the second lower value EB1, namely:

EA1=EB1.

In addition, the first selector 31 may select, as the first selected signal SD1, the first difference signal RS1 instead of the second value signal "64" when the third and the second results of comparison indicate that the second higher value EB0 is equal to the first higher value EA0 plus one, namely:

EA0+1=EB0, and that the first lower value EA1 is equal to the second lower value EB1, namely:

EA1=EB1.

Figure 9:
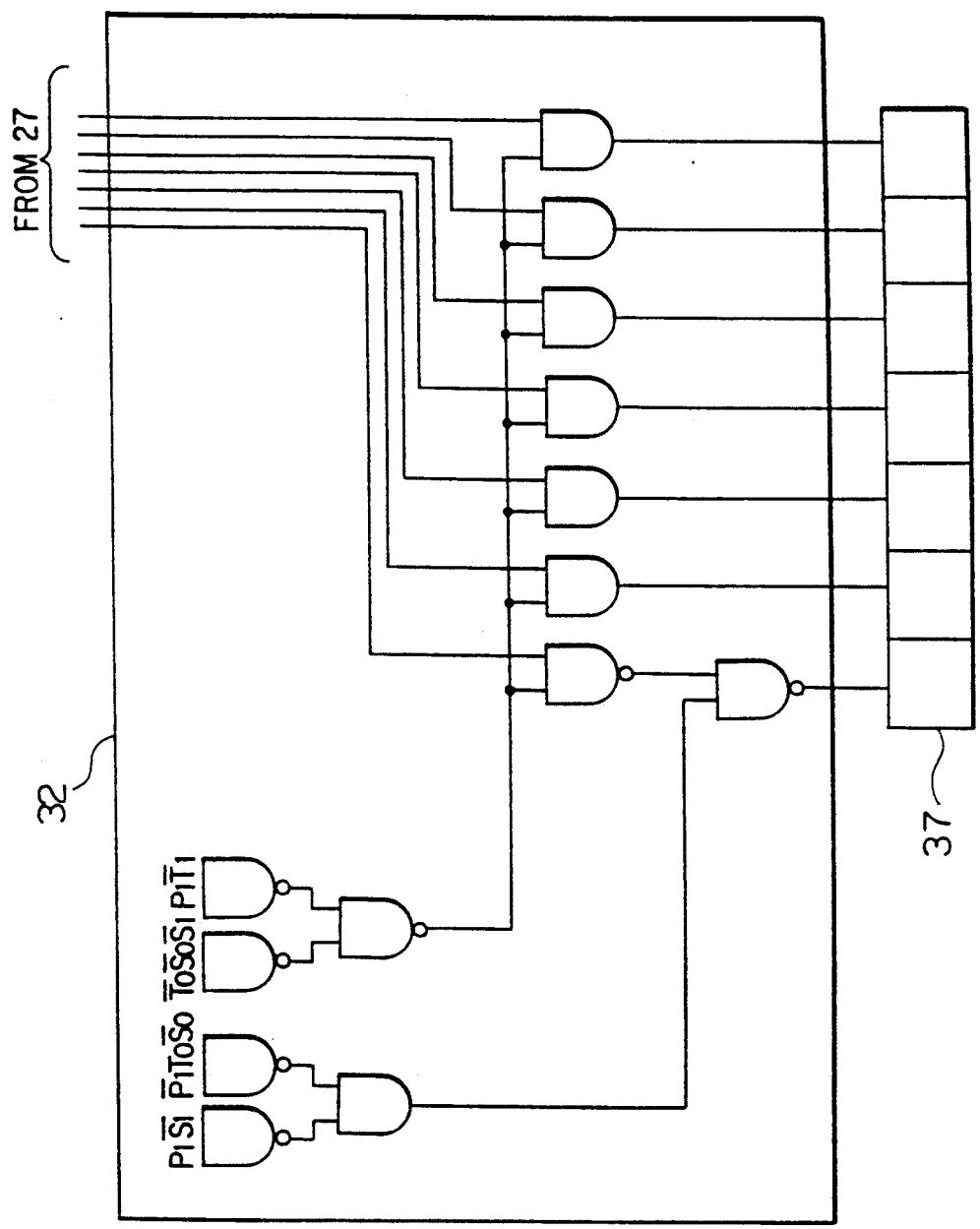
FIG. 9 is a block diagram of a second selector for use in the shift amount calculating circuit illustrated in FIG. 3.

Turning to FIG. 9, the description will proceed to the second selector 32. The second selector 32 selects the first value signal "0" as the second selected signal SD2 when the second exponent part EB is not less than the second exponent part EA, namely:

$$EB \geq EA.$$

That is, the second selector 31 selects the first value signal "0" as the second selected signal SD1 (1) when the first result of comparison indicates that the second higher value EB0 is greater than the first higher value EA0, namely:

$$EB0 > EA0,$$

or (2) when the first and the second results of comparison indicate that the second higher value EB0 is equal to the first higher value EA0, namely:

$$EB0 = EA0,$$

and that the second lower value EB1 is not less than the first lower value EA1, namely:

$$EB1 \geq EA1.$$

In other words, the second selector 32 selects the first value signal "0" as the second selected signal SD2 when a combination of the two bits $S_0$ and $T_0$ of the first compared signal $CP_1$ and the bit $T_1$ of the second compared signal CP2 satisfied a Boolean expression:

$$T_0 \times S_0 + T_0 \times S_0 \times T_1 = 1.$$

The second selector 32 selects the second difference signal RS2 as the second selected signal SD2 (1) when the first and the second results of comparison indicate that the second higher value EB0 is equal to the first higher value EA0, namely:

$$EB0 = EA0,$$

and that the second lower value EB1 is not greater than the first lower value EA1, namely:

$$EB1 \leq EA1,$$

or (2) when the fourth and the second results of comparison indicate that the first higher value EA0 is equal to the second higher value EB0 plus one, namely:

$$EB0 + 1 = EA0,$$

and that the second lower value EB1 is not less than the first lower value EA1, namely:

$$EB1 \geq EA1.$$

In other words, the second selector 32 selects the second difference signal RS2 as the second selected signal SD2 when a combination of the two bits $S_0$ and $T_0$ of the first compared signal CP1, the two bits $S_1$ and $T_1$ of the second compared signal CP2, and the bit $P_1$ of the fourth compared signal CP4 satisfies another Boolean expression:

$$\overline{T_0} \times \overline{S_0} \times \overline{S_1} + P_1 \times \overline{T_1} = 1.$$

The second selector 32 selects the second value signal "64" as the second selected signal SD2 (1) when the fourth and the second results of comparison indicate that the first higher value EA0 is equal to the second higher value EB0 plus one, namely:

$$EB0 + 1 = EA0,$$

and that the second lower value EB1 is not greater than the first lower value EA1, namely:

$$EB1 \leq EA1,$$

or (2) when the fourth and the first results of comparison indicate that the first higher value EA0 is not equal to the second higher value EB0 plus one, namely:

$$EB0 + 1 \neq EA0,$$

and that the second higher value EB0 is less than the first higher value EA0, namely:

$$EB0 < EA0.$$

In other words, the second selector 32 selects the second value signal "64" as the second selected signal SD2 when a combination of the two bits $S_0$ and $T_0$ of the first compared signal CP1, the bit $S_1$ of the second compared signal CP2, and the bit $P_1$ of the fourth compared signal CP4 satisfies still another Boolean expression:

$$P_1 \times \overline{S_1} + \overline{P_1} \times T_0 \times \overline{S_0} = 1.$$

Therefore, the second selector 32 is composed of a plurality of gates as shown in FIG. 9.

In FIG. 9, the second selector 32 selects, as the second selected signal SD2, the second difference signal RS2 when the first and the second results of comparison indicate that the second higher value EB0 is equal to the first higher value EA0, namely:

$$EB0 = EA0,$$

and that the second lower value EB1 is equal to the first lower value EA1, namely:

$$EB1 = EA1.$$

The second selector 32 selects, as the second selected signal SD2, the second value signal "64" when the fourth and the second results of comparison indicate that the first higher value EA0 is equal to the second higher value EB0 plus one, namely:

$$EB0 + 1 = EA0,$$

and that the second lower value EB1 is equal to the first lower value EA1, namely:

$$EB1 = EA1.$$

However, the second selector 32 may select, as the second selected signal SD2, the first value signal "0" instead of the second difference signal RS2 when the first and the second results of comparison indicate that the second higher value EB0 is equal to the first higher value EA0, namely:

$$EB0 = EA0,$$

and that the second lower value EB1 is equal to the first lower value EA1, namely:

$$EB1 = EA1.$$

In addition, the second selector 32 may select, as the second selected signal SD2, the second difference signal RS1 instead of the second value signal "64" when the fourth and the second results of comparison indicate that the first higher value EA0 is equal to the second higher value EB0 plus one, namely:

EB0+1=EA0, and that the second lower value EB1 is equal to the first lower value EA1, namely:

EB1=EA1.

Figure 10:
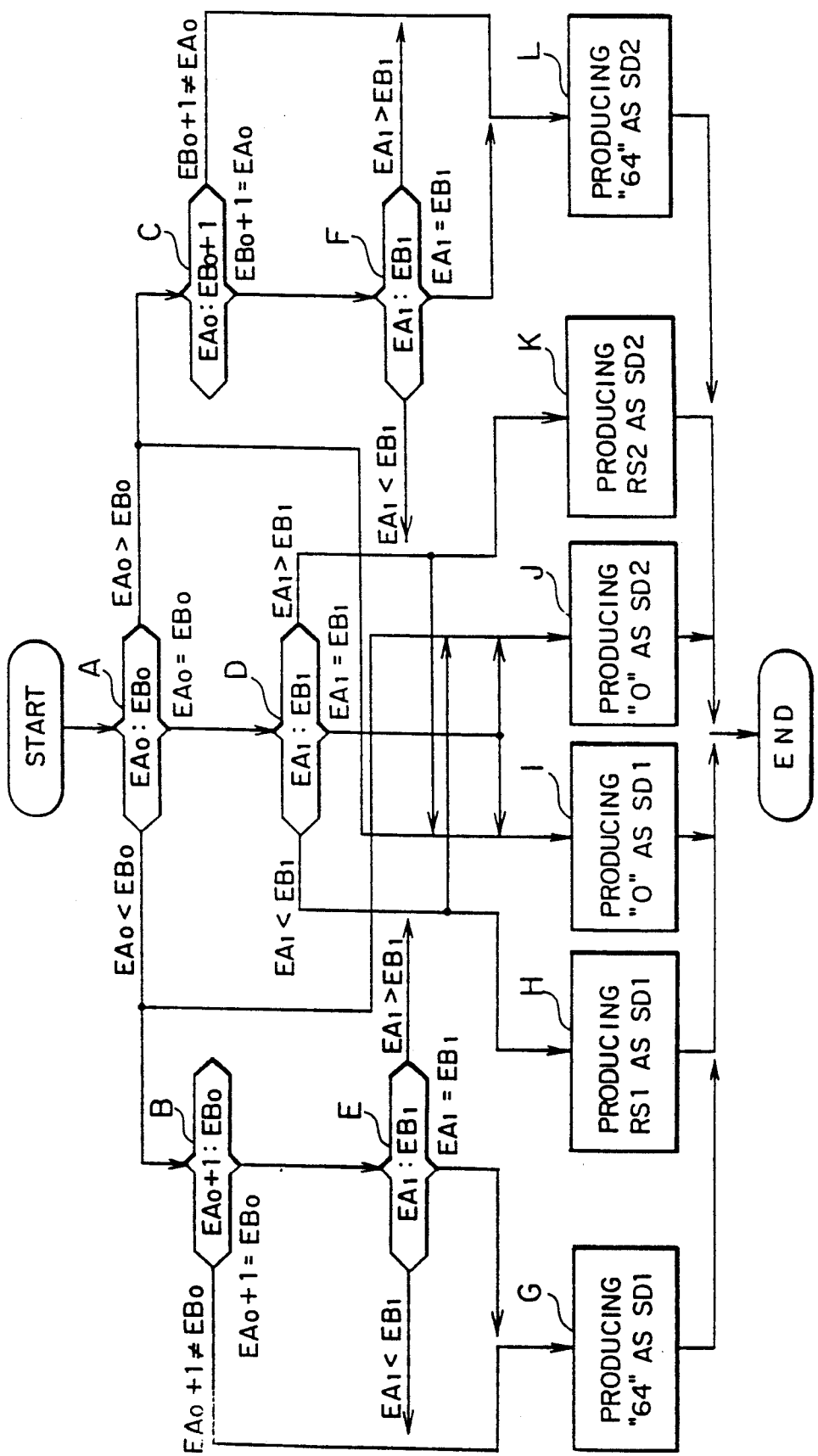
FIG. 10 is a flow chart for use in describing a shift amount calculating method according to an embodiment of this invention.

Referring to FIG. 10, a shift amount calculating method according to an embodiment of this invention is of calculating a shift amount for use in a floating-point arithmetic unit performing floating-point arithmetic of first and second input data A and B. Each of the first and the second input data A and B is represented by a floating-point representation. As shown in FIG. 2(c) before, the first input data A is composed of the first sign part SA of one bit long, the first exponent part EA of fifteen bits long, and the first mantissa part MA of forty-eight bits long. Likewise, the second input data B is composed of the second sign part SB of one bit long, the second exponent part EB of fifteen bits long, and the second mantissa part MB of forty-eight bits long, as shown in FIG. 2(d). The first exponent part EA is composed of lower six bits and higher nine bits which represent a first lower value EA1 and a first higher value EA0, respectively. Similarly, the second exponent part EB comprises lower six bits and higher nine bits which represent a second lower value EB1 and a second higher value EB0, respectively. The first and the second exponent parts EA and EB have lower seven bits which represent first and second lower numbers #EA1 and #EB1, respectively.

The shift amount is required for equalizing the floating-point of the first and the second mantissa parts MA and MB. The shift amount consists of first and second right-shift amounts SD1 and SD2 for use rightwards shifting the first and the second mantissa parts MA and MB, respectively.

The description will proceed to operation of the shift amount calculating method according to this invention. As shown in FIG. 10, the illustrated shift amount calculating method comprises first through twelfth steps A, B, C, D, E, F, G, H, I, J, K, and L.

The first step A is for comparing the higher nine bits of the first exponent part EA with the higher nine bits of the second component part EB to provide a first result of comparison by judging whether the first higher value EA0 is less than, equal to, or greater than the second higher value EB0, namely:

EA0<EB0,

EA0=EB0, or

EA0<EB0.

When the first result of comparison indicates that the first higher value EA0 is less than the second higher value EB0, namely:

EA0<EB0, the step A proceeds to the second step B and the tenth step J. When the first result of comparison indicates that the first higher value EA0 is greater than the second higher value EB0, namely:

EA1>EB0, the step A is followed by the third step e and the ninth step I. When the first result of comparison indicates that the first higher value EA0 is equal to the second higher value EB0, namely:

EA0=EB0, the step A is succeeded by the fourth step D.

When the first higher value EA0 is less than the second higher value EB0, namely:

EA0<EB0, the second step B compares the higher nine bits of the first exponent part EA with the higher nine bits of the second exponent part EB to provide a second result of comparison by judging whether or not the second higher value EB0 is equal to the first higher value EA0 plus one, namely:

EA0+1=EB0.

When the second result of comparison indicates that the second higher value EB0 is equal to the first higher value EA0 plus one, namely:

EA0+1=EB0, the second step B proceeds to the fifth step E. When the second result of comparison indicates that the second higher value EB0 is not equal to the first higher value EA0 plus one, namely:

EA0+1≠EB0, the second step B is followed by the seventh step G.

When the first higher value EA0 is greater than the second higher value EB0, namely:

EA0>EB0, the third step C compares the higher nine bits of the first exponent part EA with the higher nine bits of the second exponent part EB to provide a third result of comparison by judging whether or not the first higher value EA0 is equal to the second higher value EB0 plus one, namely:

EB0+1=EA0.

When the third result of comparison indicates that the first higher value EA0 is equal to the second higher value EB0 plus one, namely:

EB0+1=EA0, the third step C is succeeded by the sixth step F. When the third result of comparison indicates that the first higher value EA0 is not equal to the second higher value EB0 plus one, namely:

$EB0+1 \neq EA0$.

the third step C proceeds to the twelfth step L.

When the first higher value EA0 is equal to the second higher value EB0, namely:

$WA0=EB0$, the fourth step D compares the lower six bits of the first exponent part EA with the lower six bits of the second exponent part EB to provide a fourth result of comparison by judging whether the first lower value EA1 is less than, equal to, or greater than the second lower value EB1, namely:

$EA1<EB1$, $EA1=EB1$, or $EA1>EB1$.

When the fourth result of comparison indicates that the first lower value EA1 is less than the second lower value EB1, namely:

$EA1<EB1$, the fourth step D proceeds to the eighth step H and the tenth step J. When the fourth result of comparison indicates that first lower value EA1 is greater than the second lower value EB1, namely:

$EA1>EB1$, the fourth step D is followed by the eleventh step K and the ninth step I. When the fourth result of comparison indicates that the first lower value EA1 is equal to the second lower value EB1, namely:

$EA1=EB1$, the fourth step D is succeeded by the ninth step I and the tenth step J.

When the second higher value EB0 is equal to the first higher value EA0 plus one, namely:

$EA0+1=EB0$, the fifth step E compares the lower six bits of the first exponent part EA with the lower six bits of the second exponent part EB to provide a fifth result of comparison by judging whether the first lower value EA1 is less than, equal to, or greater than the second lower value EB1, namely:

$EA1<EB1$, $EA1=EB1$, or $EA1>EB1$

When the fifth result of comparison indicates that the first lower value EA1 is less than the second lower value EB1, namely:

$EA1<EB1$, the fifth step E proceeds to the seventh step G. When the fifth result of comparison indicates that the first lower value EA1 is greater than the second lower value EB1, namely:

$EA1>EB1$, the fifth step E is followed by the eighth step H and the tenth step J. When the fifth result of comparison indicates that the first lower value EA1 is equal to the second lower value EB1, namely:

$EA1=EB1$, the fifth step E is succeeded by the seventh step G.

When the first higher value EA0 is equal to the second higher value EB0 plus one, namely:

$EB0+1=EA0$, the sixth step F compares the lower six bits of the first exponent part EA with the lower six bits of the second exponent part EB to provide a sixth result of comparison by judging whether the first lower value EA1 is less than, equal to, or greater than the second lower value EB1, namely:

$EA1=EB1$, or $EA1>EB1$.

When the sixth result of comparison indicates that the first lower value EA1 is less than the second lower value EB1, namely:

$EA1<EB1$, the sixth step F proceeds the eleventh step K and the ninth step I. When the sixth result of comparison indicates that the first lower value EA1 is greater than the second lower value EB1, namely:

$EA1>EB1$, the sixth step F is followed by the twelfth step L. When the sixth result of comparison indicates that the first lower value EA1 is equal to the second lower value EB1, namely:

$EA1=EB1$, the sixth step F is succeeded by the twelfth step L.

The seventh step G produces, as the first right-shift amount SD1, a shift amount "64" exceeding the first predetermined natural number "48" (G1) when the first and the second results of comparison indicate that the first higher value EA0 is less than the second higher value EB0, namely:

$EA0<EB0$, and that the second higher value EB0 is not equal to the first higher value EA0 plus one, namely:

$EA0+1 \neq EB0$, or (G2) when the second and the fifth results of comparison indicate that the second higher value EB0 is equal to the first higher value EA0 plus one, namely:

EA0+1=EB0, and that the first lower value EA1 is not greater than the second lower value EB1, namely:

EA1<EB1.

The eighth step H subtracts the first lower number #EA1 from the second lower number #EB1 to produce, as the first right-shift amount SD1, a first result of subtraction RS1 (H1) when the second and the fifth results of comparison indicate that the second higher value EB0 is equal to the first higher value EA0 plus one, namely:

EA0+1=EB0, and that the first lower value EA1 is greater than the second lower value EB1, namely:

EA1<EB1, or (H2) when the first and the fourth results of comparison indicate that the first higher value EA0 is equal to the second higher value EB0, namely:

EA0=EB0, and that the first lower value EA1 is less than the second lower value EB1, namely:

EA1<EB1.

The ninth step I produces, as the first right-shift amount SD1, a shift amount of zero "0" (I1) when the first result of comparison indicates that the first higher value EA0 is greater than the second higher value EB0, namely:

EA0>EB0, or (I2) when the first and the fourth results of comparison indicate that the first higher value EA0 is equal to the second higher value EB0, namely:

EA0=EB0, and that the first lower value EA1 is not less than the second lower value EB1, namely:

EA1>EB1.

The tenth step J produces, as the second right-shift amount SD2, the shift amount of zero "0" (J1) when the first result of comparison indicates that the first higher value EA0 is less than the second higher value EB0, namely:

EA0<EB0, or (J2) when the first and the fourth results of comparison indicate that the first higher value EA0 is equal to the second higher value EB0, namely:

EA0=EB0, and that the first lower value EA1 is not greater than the second lower value EB1, namely:

EA1<EB1.

The eleventh step K subtracts the second lower number #EB1 from the first lower number #EA1 to produce, as the second right-shift amount SD2, a second result of subtraction RS2 (K1) when the third and the sixth results of comparison indicate that the first higher value EA0 is equal to the second higher value EB0 plus one, namely:

EB0+1=EA0, and that the first lower value EA1 is less than the second lower value EB1, namely:

EA1<EB1, or (K2) when the first and the fourth results of comparison indicate that the first higher value EA0 is equal to the second higher value EB0, namely:

EA0=EB0, and that the first lower value EA1 is greater than the second lower value EB1, namely:

EA1<EB1.

The twelfth step L produces, as the second right-shift amount SD2, the shift amount "64" exceeding the first predetermined natural number "48" (L1) when the first and the third results of comparison indicate that the first higher value EA0 is greater than the second higher value EB0, namely:

EA0>EB0, and that the first higher value EA0 is not equal to the second higher value EB0 plus one, namely:

EB0+1≠EA0, or (L2) when the third and the sixth result of comparison indicate that the first higher value EA0 is equal to the second higher value EB0 plus one, namely:

EB0+1=EA0, and that the first lower value EA0 is not less than the second lower value EB1, namely:

EA1>EB1.

Figure 11:
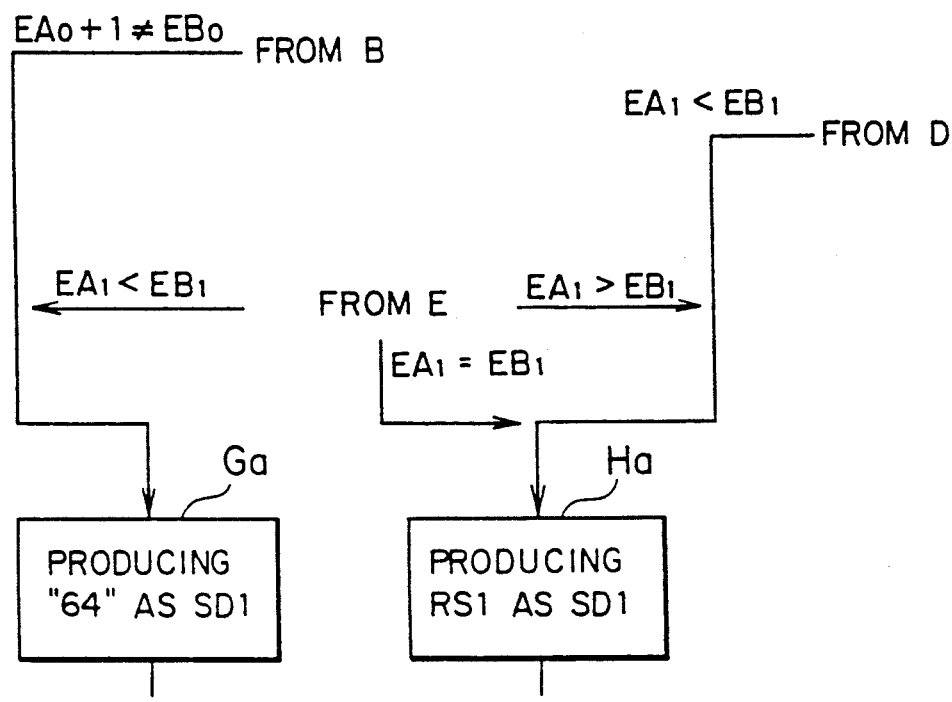
FIG. 11 is a flow chart for use in describing a part of a shift amount calculating method according to another embodiment of this invention.

Turning to FIG. 11, a shift amount calculating method according to another embodiment of this invention is similar in steps to that illustrated in FIG. 10 except that the seventh and the eighth steps are modified to be different from that described in connection with FIG. 10 as will later become clear. The seventh and the eighth steps are therefore depicted at Ga and Ha.

Instead of the seventh step G in FIG. 10, the seventh step Ga produces, as the first right-shift amount SD1, a shift amount "64" exceeding the first predetermined natural number "48" (Ga1) when the first and the second results of comparison indicate that the first higher value EA0 is less than the second higher value EB0, namely:

EA0<EB0, and that the second higher value EB0 is not equal to the first higher value EA0 plus one, namely:

EA0+1≠EB0, or (Ga2) when the second and the fifth results of comparison indicate that the second higher value EB0 is equal to the first higher value EA0 plus one, namely:

EA0+1=EB0, and that the first lower value EA1 is less than the second lower value EB1, namely:

EA1<EB1.

Instead of the eighth step H in FIG. 10, the eighth step Ha subtracts the first lower number #EA1 from the second lower number #EB1 to produce, as the first right-shift amount SD1, a first result of subtraction RS1 (Ha1) when the second and the fifth results of comparison indicate that the second higher value EB0 is equal to the first higher value EA0 plus one, namely:

EA0+1=EB0, and that the first lower value EA1 is not less than the second lower value EB1, namely:

EA1>EB1, or (Ha2) when the first and the fourth results of comparison indicate that the first higher value EA0 is equal to the second higher value EB0, namely:

EA0=EB0, and that the first lower value EA1 is less than the second lower value EB1, namely:

EA1<EB1.

Figure 12:
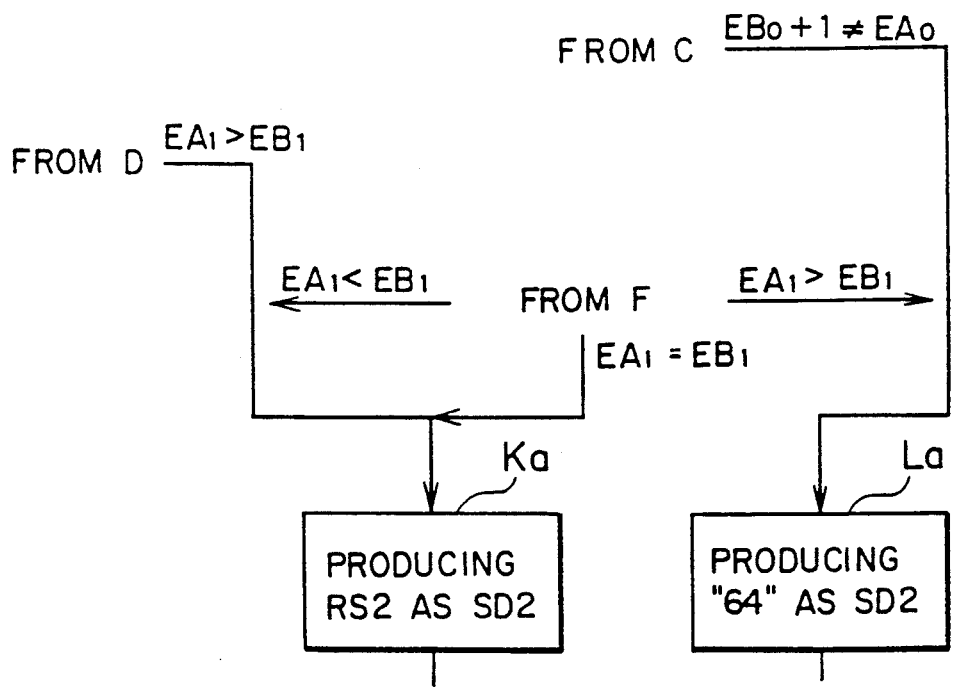
FIG. 12 is a flow chart for use in describing, in part, a shift amount calculating method according to still another embodiment of this invention.

Turning to FIG. 12, a shift amount calculating method according to still another embodiment of this invention is similar in steps to that illustrated in FIG. 10 except that the eleventh and the twelfth steps are modified from that illustrated in FIG. 10 as will later become clear. The eleventh and the twelfth steps are therefore depicted at Ka and La.

Instead of the eleventh step K in FIG. 10, the eleventh step Ka subtracts the second lower number #EB1 from the first lower number #EA1 to produce, as the second right-shift amount SD2, a second result of subtraction RS2 (Ka1) when the third and the sixth results of comparison indicate that the first higher value EA0 is equal to the second higher value EB0 plus one, namely:

EB0+1=EA0, and that the first lower value EA1 is not greater than the second lower value EB1 or (Ka2) when the first and the fourth results of comparison indicate that the first higher value EA0 is equal to the second higher value EB0, namely:

EA0=EB0, and that the first lower value EA1 is greater than the second lower value EB1, namely:

EA1>EB1.

Instead of the twelfth step L in FIG. 10, the twelfth step La produces, as the second right-shift amount SD2, the shift amount "64" exceeding the first predetermined natural number "48" (La1) when the first and the third results of comparison indicate that the first higher value EA0 is greater than the second higher value EB0, namely:

EA0>EB0, and that the first higher value EA0 is not equal to the second higher value EB0 plus one, namely:

EB0+1≠EA0, or (La2) when the third and the sixth results of comparison indicate that the first higher value EA0 is equal to the second higher value EB0 plus one, namely:

EB0+1=EA0, and that the first lower value EA1 is greater than the second lower value EB1, namely:

EA1>EB1.

Figure 13:
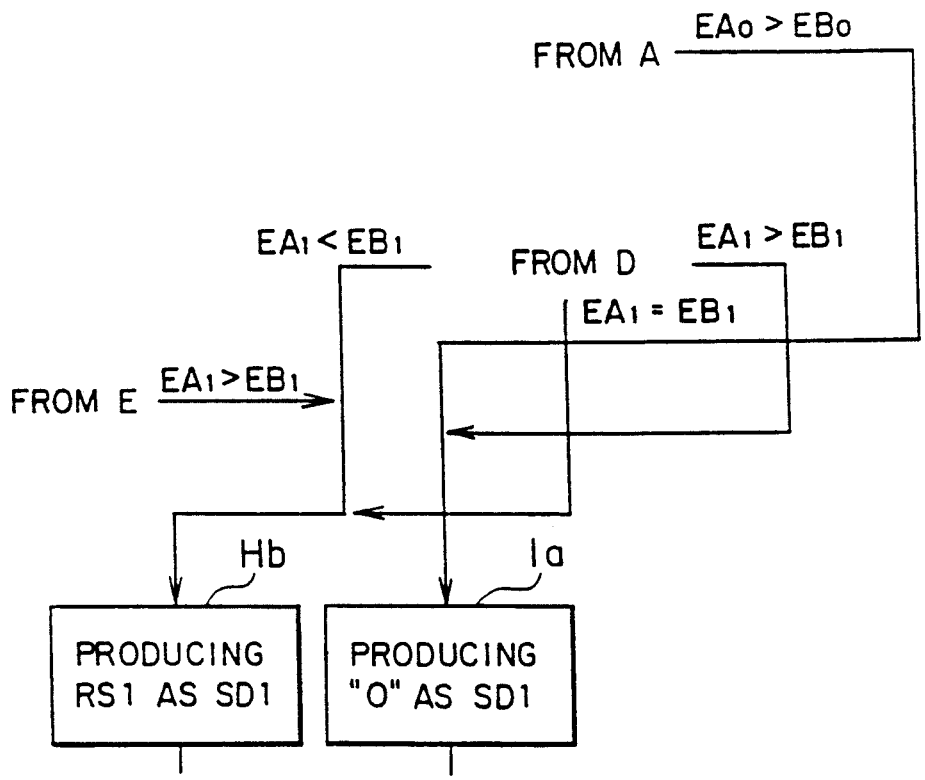
FIG. 13 is a flow chart for use in describing, in part, a shift amount calculating method according to yet another embodiment of this invention.

Turning to FIG. 13, a shift amount calculating method according to yet another embodiment of this invention is similar in steps to that illustrated in FIG. 10 except that the eighth and the ninth steps are modified from that illustrated in FIG. 10 as will later become clear. The eighth and the ninth steps are therefore depicted at Hb and Ia.

Instead of the eighth step H in FIG. 10, the eighth step Hb subtracts the first lower number #EA1 from the second lower number #EB1 to produce, as the first right-shift amount SD1, a first result of subtraction RS1 (Hb1) when the second and the fifth results of comparison indicate that the second higher value EB0 is equal to the first higher value EA0 plus one, namely:

EA0+1=EB0, and that the first lower value EA1 is greater than the second lower value EB1, namely:

EA1>EB1, or (Hb2) when the first and the fourth results of comparison indicate that the first higher value EA0 is equal to the second higher value EB0, namely:

EA0=EB0, and that the first lower value EA1 is not greater than the second lower value EB1, namely:

EA1<EB1.

Instead of the ninth step I in FIG. 10, the ninth step Ia produces, as the first right-shift amount SD1, a shift amount of zero "0" (Ia1) when the first result of comparison indicates that the first higher value EA0 is greater than the second higher value EB0, namely:

EA0>EB0, or (Ia2) when the first and the fourth results of comparison indicate that the first higher value EA0 is equal to the second higher value EB0, namely:

EA0=EB0, and that the first lower value EA1 is greater than the second lower value EB1, namely:

EA1>EB1.

Figure 14:
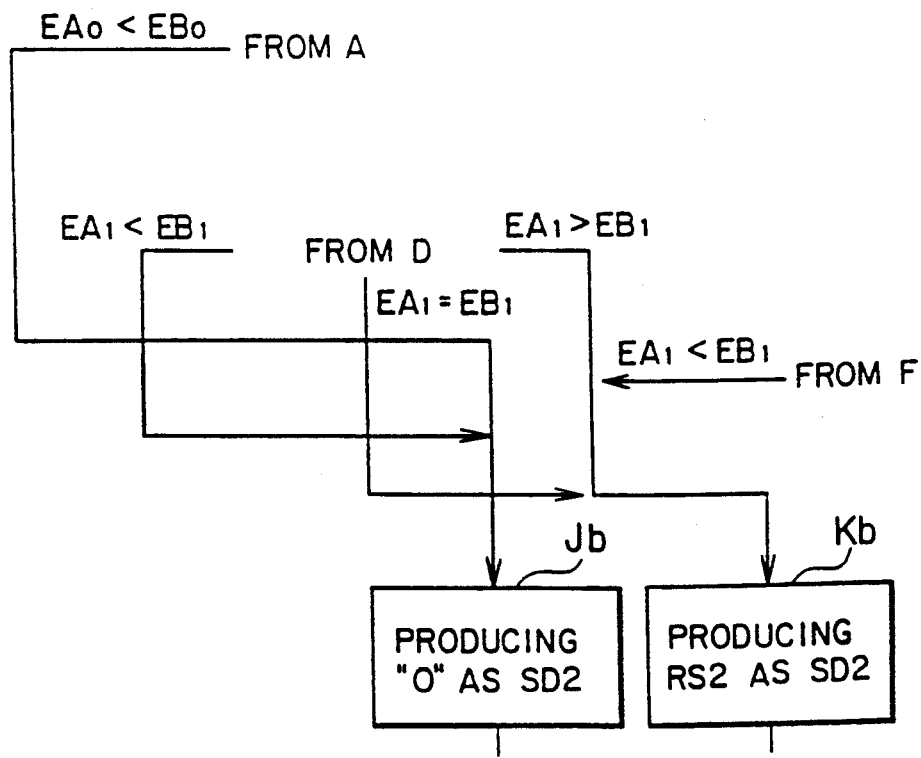
FIG. 14 is a flow chart for use in describing, in part, a shift amount calculating method according to a further embodiment of this invention.

Turning to FIG. 14, a shift amount calculating method according to a further embodiment of this invention is similar in steps to that illustrated in FIG. 10 except that the tenth and the eleventh steps are modified from that illustrated in FIG. 10 as will later become clear. The tenth and the eleventh steps are therefore depicted at Ja and Kb.

Instead of the tenth step J in FIG. 10, the tenth step Ja produces, as the second right-shift amount SD2, a shift amount of zero "0" (Ja1) when the first result of comparison indicates that the first higher value EA0 is less than the second higher value EB0, namely:

EA0<EB0, or (Ja2) when the first and the fourth results of comparison indicate that the first higher value EA0 is equal to the second higher value EB0, namely:

EA0=EB0, and that the first lower value EA1 is less than the second lower value EB1, namely:

EA1<EB1.

Instead of the eleventh step K in FIG. 10, the eleventh step Kb subtracts the second lower number #EB1 from the first lower number #EA1 to produce, as the second right-shift amount SD2, a second result of subtraction RS2 (Kb1) when the third and the sixth results of comparison indicate that the first higher value EA0 is equal to the second higher value EB0 plus one, namely:

EB0+1=EA0, and that the first lower value EA1 is less than the second lower value EB1, namely:

EA1<EB1, or (Kb2) when the first and the fourth results of comparison indicate that the first higher value EA0 is equal to the second higher value EB0, namely:

EA0=EB0, and that the first lower value EA1 is not less than the second lower value EB1, namely:

EA1>EB1.

Figure 15:
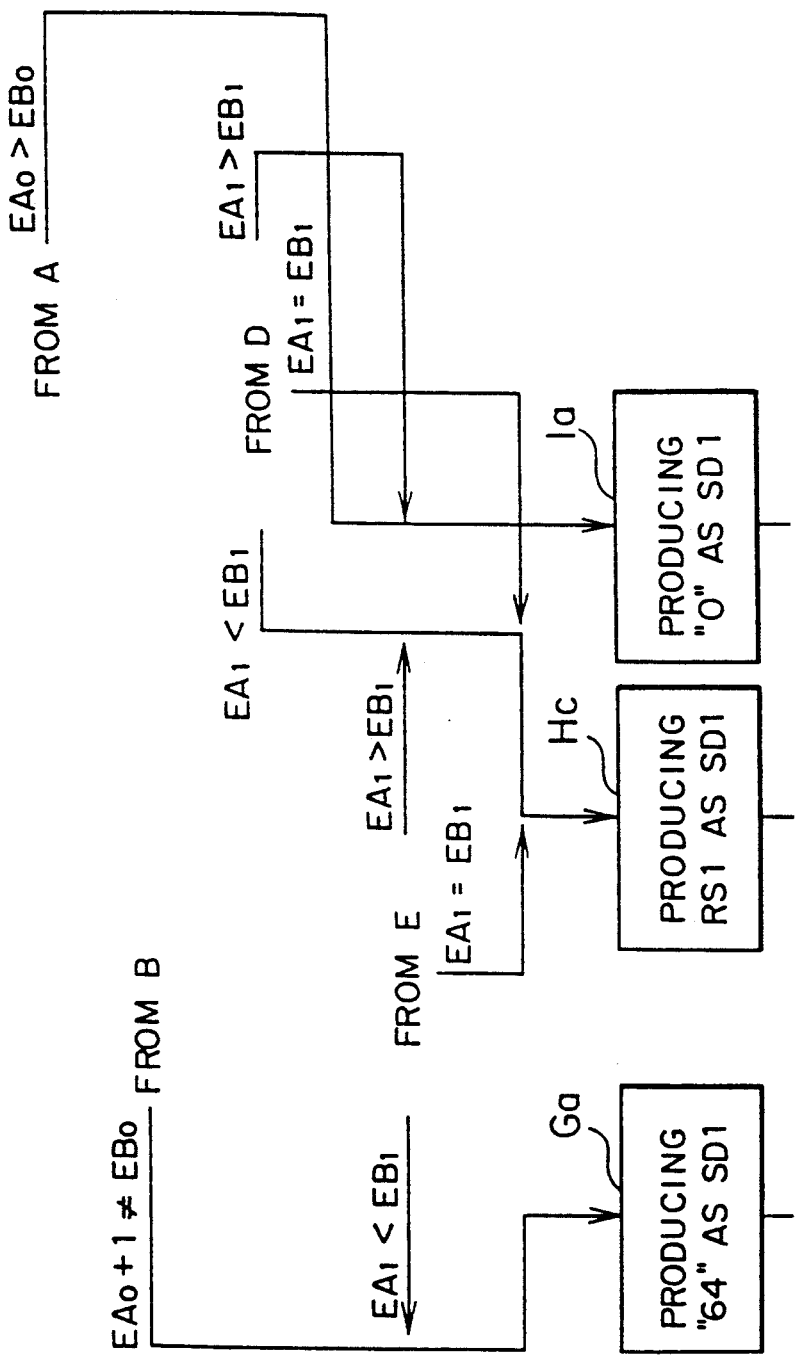
FIG. 15 is a flow chart for use in describing, in part, a shift amount calculating method according to a still further embodiment of this invention.

Turning to FIG. 15, a shift amount calculating method according to a still further embodiment of this invention is similar in steps to that illustrated in FIG. 10 except that the seventh through the ninth steps are modified from that illustrated in FIG. 10 as will later become clear. The seventh through the ninth steps are therefore depicted at Ga, Hc, and Ia. The seventh and the ninth steps Ga and Ia are similar to the seventh step Ga illustrated in FIG. 11 and the ninth step Ia illustrated in FIG. 13. Therefore, the description will be omitted as regards the seventh and the ninth steps Ga and Ia.

Instead of the eighth step H in FIG. 10, the eight step Hc subtracts the first lower number #EA1 from the second lower number #EB1 to produce, as the first right-shift amount SD1, a first result of subtraction RS1 (Hc1) when the second and the fifth results of comparison indicate that the second higher value EB0 is equal to the first higher value EA0 plus one, namely:
$EA0+1=EB0$, and that the first lower value EA1 is not less than the second lower value EB1, namely:

EA1>EB1, or (Hc2) when the first and the fourth results of comparison indicate that the first higher value EA0 is equal to the second higher value EB0, namely:

EA0=EB0, and that the first lower value EA1 is not greater than the second lower value EB1, namely:

EB1<EB1.

Figure 16:
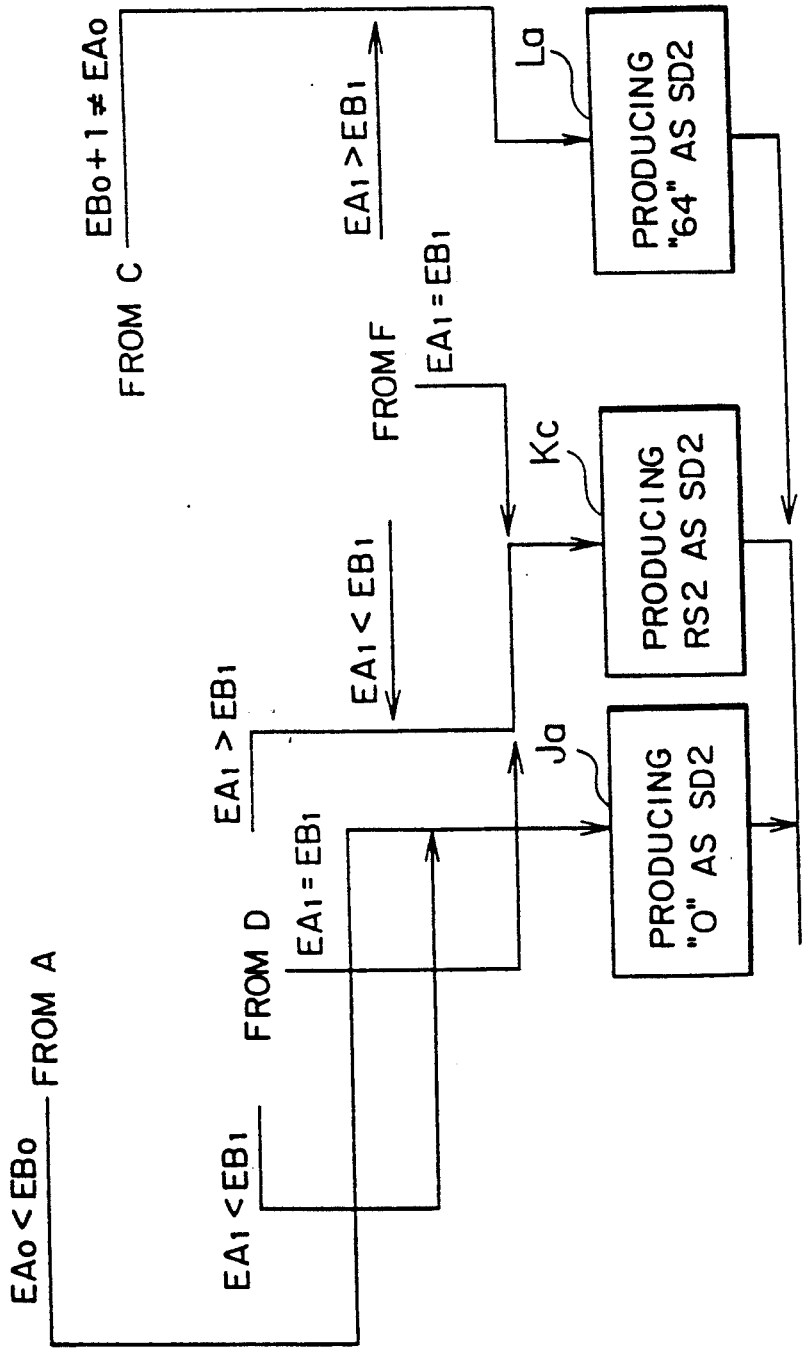
FIG. 16 is a flow chart for use in describing, in part, a shift amount calculating method according to a yet further embodiment of this invention.

Turning to FIG. 16, a shift amount calculating method according to a yet further embodiment of this invention is similar in steps to that illustrated in FIG. 10 except that the tenth through the twelfth steps are modified from that illustrated in FIG. 10 as will later become clear. The tenth through the twelfth steps are therefore depicted at Ja, Kc, and La. The tenth and the twelfth steps Ja and La are similar to the tenth step Ja illustrated in FIG. 14 and the twelfth step La illustrated in FIG. 12. Therefore, the description will be omitted as regards the tenth and the twelfth steps Ja and La.

Instead of the eleventh step K in FIG. 10, the eleventh step Kc subtracts the second lower number #EB1 from the first lower number #EA1 to produce, as the second right-shift amount SD2, a second result of subtraction RS1 (Kc1) when the third and the sixth results of comparison indicate that the first higher value EA0 is equal to the second higher value EB0 plus one, namely:

EB0+1=EA0, and that the first lower value EA1 is not greater than the second lower value EB1, namely:

EA1<EB1, or (Kc2) when the first and the fourth results of comparison indicate that the first higher value EA0 is equal to the second higher value EB0 and that the first lower value EA1 is not less than the second lower value EB1, namely:

EA1>EB1.

What is claimed is:

1. A shift amount calculating circuit for use in a floating-point arithmetic unit for performing floating-point arithmetic of first and second input data which are represented by a floating-point representation and composed of first and second exponent parts and first and second mantissa parts, each of said first and said second mantissa parts being N bits long, where N represents a first predetermined natural number which is greater than $2^{n-1}$ and is not greater than $2^n$, where n represents a predetermined positive integer, each of said first and said second exponent parts being M bits long, where M represents a second predetermined natural number which is greater than said predetermined positive integer plus one, said shfit amount calculating circuit being for calculating a shift amount required for equalizing the floating-point of said first and second mantissa parts, said shift amount consisting of first and second right-shift amounts for use in rightwards shifting said first and said second mantissa parts, respectively, said shift amount calculating circuit comprising:
- a first subtracter supplied with lower (n+1) bits of said first and said second exponent parts for subtracting a first lower number represented by the lower (n+1) bits of said first exponent part from a second lower number represented by the lower (n+1) bits of said second exponent part to produce a first difference signal representative of a first result of subtraction;
- a second subtracter supplied with the lower (n+1) bits of said first and said second exponent parts for subtracting said second lower number from said first lower number to produce a second difference signal representative of a second result of subtraction;
- comparing means supplied with said first and said second exponent parts for comparing said first exponent part with said second exponent part to produce a comparison result signal indicative of a result of comparison;
- a first selector connected to said first subtracter and said comparing means and supplied with a first value signal indicative of a shift amount of zero and a second value signal indicative of a shift amount greater than said first predetermined natural number for selecting, in response to said comparison result signal, one of said first difference signal and said first and said second value signal to produce a first selected signal as a first right-shift amount signal indicative of said first right-shift amount; and
- a second selector connected to said second subtracter and said comparing means and supplied with said first and said second value signals for selecting, in response to said comparison result signal, one of said second difference signal and said first and said second value signals to produce a second selected signal as a second right-shift amount signal indicative of said second right-shift amount.

2. A shift amount calculating circuit as claimed in claim 1, further comprising:
- a first register connected to said first selector for holding said first selected signal as a first held signal to produce said first held signal as said first right-shift amount signal; and
- a second register connected to said second selector for holding said second selected signal as a second held signal to produce said second held signal as said second right-shift amount signal.

3. A shift amount calculating circuit as claimed in claim 1, each of said first and said second exponent parts consisting of lower n bits and higher (M−n) bits, the lower n bits of said first and said second exponent parts representing first and second lower values, respectively, the higher (M−n) bits of said first and said second exponent parts representing first and second higher values, respectively, wherein said comparing means comprises:
- a first comparator supplied with a higher (M−n) bits of said first and said second exponent parts for comparing the higher (M−n) bits of said first exponent part with the higher (M−n) bits of said second exponent part to produce a first compared signal representative of a first result of comparison, said first result of comparison representing whether said first higher value is greater than, equal to, or less than said second higher value;
- a second comparator supplied with the lower n bits of said first and said second exponent parts for comparing the lower n bits of said first exponent part with the lower n bits of said second exponent part to produce a second compared signal representative of a second result of comparison, said second result of comparison representing whether said first lower value is greater than, equal to, or less than said second lower value;
- a third comparator supplied with the higher (M−n) bits of said first and said second exponent parts for comparing the higher (M−n) bits of aid first exponent part with the higher (M−n) bits of said second exponent part to produce a third compared signal representative to a third result of comparison, said third result of comparison representing whether or not said second higher value is equal to said first higher value plus one;
- a fourth comparator supplied with the higher (M−n) bits of said first and said second exponent parts for comparing the higher (M−n) bits of said first exponent part with the higher (M−n) bits of said second exponent part to produce a fourth compared signal representative of a fourth result of comparison, said fourth result of comparison representing whether or not said first higher value is equal to said second higher value plus one; and
- supplying means connected to said first through said fourth comparators and said first and said second selectors for collectively supplying as said comparison result signal, said first through said fourth compared signals to said first and said second selectors.

4. A shift amount calculating circuit as claimed in claim 3, wherein:
said first selector is for selecting said first value signal as said first selected signal (1) when the first result of comparison indicates that said first higher value is greater than said second higher value or (2) when the first and the second results of comparison indicate that said first higher value is equal to said second higher value and that said first lower value is greater than said second lower value; said first selector being for selecting said first difference signal as said first selected signal (1) when the first and the second results of comparison indicate that said first higher value is equal to said second higher value and that said first lower value is less than said second lower value or (2) when the third and the second results of comparison indicate that said second higher value is equal to said first higher value plus one and that said first lower value is greater than said second lower value; said first selector being for selecting said second value signal as said first selected signal (1) when the third and the second results of comparison indicate that said second higher value is equal to said first higher value plus one and that said first lower value is less than said second lower value or (2) when the third and the first results of comparison indicate that said second higher value is not equal to said first higher value plus one and that said first higher value is less than said second higher value.

5. A shift amount calculating circuit as claimed in claim 4, wherein said first selector is for selecting said first value signal as said first selected signal when the first and the second results of comparison indicate that said first higher value is equal to said second higher value and that said first lower value is equal to said second lower value.

6. A shift amount calculating circuit as claimed in claim 4, wherein said first selector is for selecting said first difference signal as said first selected signal when the first and the second results of comparison indicate that said first higher value is equal to said second higher value and that said first lower value is equal to said second lower value.

7. A shift amount calculating circuit as claimed in claim 4, wherein said first selector is for selecting said first difference signal as said first selected signal when the third and the second results of comparison indicate that said second higher value is equal to said first higher value plus one and that said first lower value is equal to said second lower value.

8. A shift amount calculating circuit as claimed in claim 4, wherein said first selector is for selecting said second value signal as said first selected signal when the third and the second results of comparison indicate that said second higher value is equal to said first higher value plus one and that said first lower value is equal to said second lower value.

9. A shift amount calculating circuit as claimed in claim 3, wherein:
said second selector is for selecting said first value signal as said second selected signal (1) when the first result of comparison indicates that said first higher value is less than said second higher value or (2) when the first and the second results of comparison indicate that said first higher value is equal to said second higher value and that said first lower value is less than said second lower value; said second selector being for selecting said second difference signal as said second selected signal (1) when the first and the second results of comparison indicate that said first higher value is equal to said second higher value and that said first lower value is greater than second lower value or (2) when the fourth and the second results of comparison indicate that said first higher value is equal to said second higher value plus one and that said first lower value is less than said second lower value; said second selector being for selecting said second value signal as said second selected signal (1) when the fourth and the second results of comparison indicate that said first higher value is equal to said second higher value plus one and that said first lower value is greater than said second lower value or (2) when the fourth and the first results of comparison indicate that said first higher value is not equal to said second higher value plus one and that said first higher value is greater than said second higher value.

10. A shift amount calculating circuit as claimed in claim 9, wherein said second selector is for selecting said first value signal as said second selected signal when the first and the second results of comparison indicate that said first higher value is equal to said second higher value and that said first lower value is equal to said second lower value.

11. A shift amount calculating circuit as claimed in claim 9, wherein said second selector is for selecting said second difference signal as said second selected signal when the first and the second results of comparison indicate that said first higher value is equal to said second higher value and that said first lower value is equal to said second lower value.

12. A shift amount calculating circuit as claimed in claim 9, wherein said second selector is for selecting said second difference signal as said second selected signal when the fourth and the second results of comparison indicate that said first higher value is equal to said second higher value plus one and that said first lower value is equal to said second lower value.

13. A shift amount calculating circuit as claimed in claim 9, wherein said second selector is for selecting said second value signal as said second selected signal when the fourth and the second results of comparison indicate that said first higher value is equal to said second higher value plus one and that said first lower value is equal to said second lower value.

14. A method of calculating a shift amount for use in a floating-point arithmetic unit performing floating-point arithmetic of first and second input data which are represented by a floating-point representation and composed of first and second exponent parts and first and second mantissa parts, each of said first and said second mantissa parts being N bits long, where N represents a first predetermined natural number which is greater than $2^{n-1}$ and is not greater than $2^n$, where n represents a predetermined positive integer, each of said first and said second exponent parts being M bits long, where M represents a second predetermined natural number which is greater than said predetermined positive integer plus one, said shift amount being required for equalizing the floating-point of said first and said second mantissa parts, said shift amount consisting of first and second right-shift amounts for use rightwards shifting said first and said second mantissa parts, respectively, said method comprising the steps of:

(A) comparing higher (M−n) bits of said first exponent part with the higher (M−n) bits of said second exponent part to provide a first result of comparison by judging whether a first higher value is represented by the higher (M−n) bits of said first exponent part to be less than, equal to, or greater than a second higher value represented by the higher (M−n) bits of said second exponent part;

(B) comparing the higher (M−n) bits of said first exponent part with the higher (M−n) bits of said second exponent part when said first higher value is less than said second higher value to provide a second result of comparison by judging whether or not said second higher value is equal to said first higher value plus one;

(C) comparing the higher (M−n) bits of said first exponent part with the higher (M−n) bits of said second exponent part when said first higher value is greater than said second higher value to provide a third result of comparison by judging whether or not said first higher value is equal to said second higher value plus one;

(D) comparing lower n bits of said first exponent part with the lower n bits of said second exponent part when said first higher value is equal to said second higher value to provide a fourth result of comparison by judging whether a first lower value is represented by the lower n bits of said first exponent part to be less than, equal to, or greater than a second lower value represented by the lower n bits of said second exponent part;

(E) comparing the lower n bits of said first exponent part with the lower n bits of said second exponent part when said second higher value is equal to said first higher value plus one to provide a fifth result of comparison by judging whether said first lower value is less than, equal to, or greater than said second lower value;

(F) comparing the lower n bits of said first exponent part with the lower n bits of said second exponent part when said first higher value is equal to said second higher value plus one to provide a sixth result of comparison by judging whether said first lower value is less than, equal to, or greater than said second lower value;

(G) producing, as said first right-shift amount, a shift amount exceeding said first predetermined natural number (G1) when the first and the second results of comparison indicate that said first higher value is less than said second higher value and that said second higher value is not equal to said first higher value plus one or (G2) when the second and the fifth results of comparison indicate that said second higher value is equal to said first higher value plus one and that said first lower value is not greater than said second lower value;

(H) subtracting a first lower number represented by lower (n+1) bits of said first exponent part from a second lower number represented by the lower (n+1) bits of said first exponent part to produce, as said first right-shift amount, a first result of subtraction (H1) when the second and the fifth results of comparison indicate that said second higher value is equal to said first higher value plus one and that said first lower value is greater than said second lower value or (H2) when the first and the fourth results of comparison indicate that said first higher value is equal to said second higher value and that said first lower value is less than said second lower value;

(I) producing, as said first right-shift amount, a shift amount of zero (I1) when the first result of comparison indicates that said first higher value is greater than said second higher value or (I2) when the first and the fourth results of comparison indicate that said first higher value is equal to said second higher value and that said first lower value is not less than said second lower value;

(J) producing, as said second right-shift amount, the shift amount of zero (J1) when the first result of comparison indicates that said first higher value is less than said second higher value or (J2) when the first and the fourth results of comparison indicate that said first higher value is equal to second higher value and that said first lower value is not greater than said second lower value;

(K) subtracting said second lower number from said first lower number to produce, as said second right-shift amount, a second result of subtraction (K1) when the third and the sixth results of comparison indicate that said first higher value is equal to said second higher value plus one and that said first lower value is less than said second lower value or (K2) when the first and the fourth results of comparison indicate that said first higher value is equal to said second higher value and that said first lower value is greater than said second lower value; and (L) producing, as said second right-shift amount, the shift amount exceeding said first predetermined natural number (L1) when the first and the third results of comparison indicate that said first higher value is greater than said second higher value and that said first higher value is not equal to said second higher value plus one or (L2) when the third and the sixth result of comparison indicate that said first higher value is equal to said second higher value plus one and that said first lower value is not less than said second lower value.

15. A method of calculating a shift amount for use in a floating-point arithmetic unit performing floating-point arithmetic of first and second input data which are represented by a floating-point representation and composed of first and second exponent parts and first and second mantissa parts, each of said first and said second mantissa parts being N bits long, where N represents a first predetermined natural number which is greater than $2^{n-1}$ and is not greater than $2^n$, where n represents a predetermined positive integer, each of said first and said second exponent parts being M bits long, where M represents a second predetermined natural number which is greater than said predetermined positive integer plus one, said shift amount being required for equalizing the floating-point of said first and said second mantissa parts, said shift amount consisting of first and second right-shift amounts for use rightwards shifting said first and said second mantissa parts, respectively, said method comprising the steps of:

(A) comparing higher (M−n) bits of said first exponent part with the higher (M−n) bits of said second exponent part to provide a first result of comparison by judging whether a first higher value is represented by the higher (M−n) bits of said first exponent part to be less than, equal to, or greater than a second higher value represented by the higher (M−n) bits of said second exponent part;

(B) comparing the higher (M−n) bits of said first exponent part with the higher (M−n) bits of said second exponent part when said first higher value is less than said second higher value to provide a second result of comparison by judging whether or not said second higher value is equal to said first higher value plus one;

(C) comparing the higher (M−n) bits of said first exponent part with the higher (M−n) bits of said second exponent part when said first higher value is greater than said second higher value to provide a third result of comparison by judging whether or not said first higher value is equal to said second higher value plus one;

(D) comparing lower n bits of said first exponent part with the lower n bits of said second exponent part when said first higher value is equal to said second higher value to provide a fourth result of comparison by judging whether a first lower value is represented by the lower n bits of said first exponent part to be less than, equal to, or greater than a second lower value represented by the lower n bits of said second exponent part;

(E) comparing the lower n bits of said first exponent part with the lower n bits of said second exponent part when said second higher value is equal to said first higher value plus one to provide a fifth result of comparison by judging whether said first lower value is less than, equal to, or greater than said second lower value;

(F) comparing the lower n bits of said first exponent part with the lower n bits of said second exponent part when said first higher value is equal to said second higher value plus one to provide a sixth result of comparison by judging whether said first lower value is less than, equal to, or greater than said second lower value;

(Ga) producing, as said first right-shift amount, a shift amount exceeding said first predetermined natural number (Ga1) when the first and the second results of comparison indicate that said first higher value is less than said second higher value and that said second higher value is not equal to said first higher value plus one or (Ga2) when the second and the fifth results of comparison indicate that said second higher value is equal to said first higher value plus one and that said first lower value is less than said second lower value;

(Ha) subtracting a first lower number represented by lower (n+1) bits of said first exponent part from a second lower number represented by the lower (n+1) bits of said first exponent part to produce, as said first right-shift amount, a first result of subtraction (Ha1) when the second and the fifth results of comparison indicate that said second higher value is equal to said first higher value plus one and that said first lower value is not less than said second lower value or (Ha2) when the first and the fourth results of comparison indicate that said first higher value is equal to said second higher value and that said first lower value is less than said second lower value;

(I) producing, as said first right-shift amount, a shift amount of zero (I1) when the first result of comparison indicates that said first higher value is greater than said second higher value or (I2) when the first and the fourth results of comparison indicate that said first higher value is equal to said second higher value and that said first lower value is not less than said second lower value;

(J) producing, as said second right-shift amount, the shift amount of zero (J1) when the first result of comparison indicates that said first higher value is less than said second higher value or (J2) when the first and the fourth results of comparison indicate that said first higher value is equal to said second higher value and that said first lower value is not greater than said second lower value;

(K) subtracting said second lower number from said first lower number to produce, as said second right-shift amount, a second result of subtraction (K1) when the third and the sixth results of comparison indicate that said first higher value is equal to said second higher value plus one and that said first lower value is less than said second lower value or (K2) when the first and the fourth results of comparison indicate that said first higher value is equal to said second higher value and that said first lower value is greater than said second lower value; and (L) producing, as said second right-shift amount, the shift amount exceeding said first predetermined natural number (L1) when the first and the third results of comparison indicate that said first higher value is greater than said second higher value and that said first higher value is not equal to said second higher value plus one or (L2) when the third and the sixth result of comparison indicate that said first higher value is equal to said second higher value plus one and that said first lower value is not less than said second lower value.

16. A method of calculating a shift amount for use in a floating-point arithmetic unit performing floating-point arithmetic of first and second input data which are represented by a floating-point representation and composed of first and second exponent parts and first and second mantissa parts, each of said first and said second mantissa parts being N bits long, where N represents a first predetermined natural number which is greater than $2^{n-1}$ and is not greater than $2^n$, which n represents a predetermined positive integer, each of said first and said second exponent parts being M bits long, where M represents a second predetermined natural number which is greater than said predetermined positive integer plus one, said shift amount being required for equalizing the floating-point of said first and said second mantissa parts, said shift amount consisting of first and second right-shift amounts for use rightwards shifting said first and said second mantissa parts, respectively, said method comprising the steps of:

(A) comparing higher (M−n) bits of said first exponent part with the higher (M−n) bits of said second exponent part to provide a first result of comparison by judging whether a first higher value is represented by the higher (M−n) bits of said first exponent part to be less than, equal to, or greater than a second higher value represented by the higher (M−n) bits of said second exponent parts;

(B) comparing the higher (M−n) bits of said first exponent part with the higher (M−n) bits of said second exponent part when said first higher value is less than said second higher value to provide a second result of comparison by judging whether or not said second higher value is equal to said first higher value plus one;

(C) comparing the higher (M−n) bits of said first exponent part with the higher (M−n) bits of said second exponent part when said first higher value is greater than said second higher value to provide a third result of comparison by judging whether or not said first higher value is equal to said second higher value plus one;

(D) comparing lower n bits of said first exponent part with the lower n bits of said second exponent part when said first higher value is equal to said second higher value to provide a fourth result of comparison by judging whether a first lower value is represented by the lower n bits of said first exponent part to be less than, equal to, or greater than a second lower value represented by the lower n bits of said second exponent part;

(E) comparing the lower n bits of said first exponent part with the lower n bits of said second exponent part when said second higher value is equal to said first higher value plus one to provide a fifth result of comparison by judging whether said first lower value is less than, equal to, or greater than said second lower value;

(F) comparing the lower n bits of said first exponent part with the lower n bits of said second exponent part when said first higher value is equal to said second higher value plus one to provide a sixth result of comparison by judging whether said first lower value is less than, equal to, or greater than said second lower value;

(G) producing, as said first right-shift amount, a shift amount exceeding said first predetermined natural number (G1) when the first and the second results of comparison indicate that said first higher value is less than said second higher value and that said second higher value is not equal to said first higher value plus one or (G2) when the second and the fifth results of comparison indicate that said second higher value is equal to said first higher value plus one and that said first lower value is not greater than said second lower value;

(H) subtracting a first lower number represented by lower (n+1) bits of said first exponent part from a second lower number represented by the lower (n+1) bits of said first exponent part to produce, as said first right-shift amount, a first result of subtraction (H1) when the second and the fifth results of comparison indicate that said second higher value is equal to said first higher value plus one and that said first lower value is greater than said second lower value or (H2) when the first and the fourth results of comparison indicate that said first higher value is equal to said second higher value and that said first lower value is less than said second lower value;

(I) producing, as said first right-shift amount, a shift amount of zero (I1) when the first result of comparison indicates that said first higher value is greater than said second higher value or (I2) when the first and the fourth results of comparison indicate that said first higher value is equal to said second higher value and that said first lower value is not less than said second lower value;

(J) producing, as said second right-shift amount, the shift amount of zero (J1) when the first result of comparison indicates that said first higher value is less than said second higher value or (J2) when the first and the fourth results of comparison indicate that said first higher value is equal to said second higher value and that said first lower value is not greater than said second lower value;

(Ka) subtracting said second lower number from said first lower number to produce, as said second right-shift amount, a second result of subtraction (Ka1) when the third and the sixth results of comparison indicate that said first higher value is equal to said second higher value plus one and that said first lower value is not greater than said second lower value or (Ka2) when the first and the fourth results of comparison indicate that said first higher value is equal to said second higher value and that said first lower value is greater than said second lower value; and (La) producing, as said second right-shift amount, the shift amount exceeding said first predetermined natural number (La1) when the first and the third results of comparison indicate that said first higher value is greater than said second higher value and that said first higher value is not equal to said second higher value plus one or (La2) when the third and the sixth result of comparison indicate that said first higher value is equal to said second higher value plus one and that said first lower value is greater than said second lower value.

17. A method of calculating a shift amount for use in a floating-point arithmetic unit performing floating-point arithmetic of first and second input data which are represented by a floating-point representation and composed of first and second exponent parts and first and second mantissa parts, each of said first and said second mantissa parts being N bits long, where N represents a first predetermined natural number which is greater than $2^{n-1}$ and is not greater than $2^n$, where n represents a predetermined positive integer, each of said first and said second exponent parts being M bits long, where M represents a second predetermined natural number which is greater than said predetermined positive integer plus one, said shift amount being required for equalizing the floating-point of said first and said second mantissa parts, said shift amount consisting of first and second right-shift amounts for use rightwards shifting said first and said second mantissa parts, respectively, said method comprising the steps of:

(A) comparing higher (M−n) bits of said first exponent part with the higher (M−n) bits of said second exponent part to provide a first result of comparison by judging whether a first higher value is represented by the higher (M−n) bits of said first exponent part to be less than, equal to, or greater than a second higher value represented by the higher (M−n) bits of said second exponent part;

(B) comparing the higher (M−n) bits of said first exponent part with the higher (M−n) bits of said second exponent part when said first higher value is less than said second higher value to provide a second result of comparison by judging whether or not said second higher value is equal to said first higher value plus one;

(C) comparing the higher (M−n) bits of said first exponent part with the higher (M−n) bits of said second exponent part when said first higher value is greater than said second higher value to provide a third result of comparison by judging whether or not said first higher value is equal to said second higher value plus one;

(D) comparing lower n bits of said first exponent part with the lower n bits of said second exponent part when said first higher value is equal to said second higher value to provide a fourth result of comparison by judging whether a first lower value is represented by the lower n bits of said first exponent part to be less than, equal to, or greater than a second lower value represented by the lower n bits of said second exponent part;

(E) comparing the lower n bits of said first exponent part with the lower n bits of said second exponent part when said second higher value is equal to said first higher value plus one to provide a fifth result of comparison by judging whether said first lower value is less than, equal to, or greater than said second lower value;

(F) comparing the lower n bits of said first exponent part with the lower n bits of said second exponent part when said first higher value is equal to said second higher value plus one to provide a sixth result of comparison by judging whether said first lower value is less than, equal to, or greater than said second lower value;

(Ga) producing, as said first right-shift amount, a shift amount exceeding said first predetermined natural number (Ga1) when the first and the second results of comparison indicate that said first higher value is less than said second higher value and that said second higher value is not equal to said first higher value plus one or (Ga2) when the second and the fifth results of comparison indicate that said second higher value is equal to said first higher value plus one and that said first lower value is less than said second lower value;

(Ha) subtracting a first lower number represented by lower (n+1) bits of said first exponent part from a second lower number represented by the lower (n+1) bits of said first exponent part to produce, as said first right-shift amount, a first result of subtraction (Ha1) when the second and the fifth results of comparison indicate that said second higher value is equal to said first higher value plus one and that said first lower value is not less than said second lower value or (Ha2) when the first and the fourth results of comparison indicate that said first higher value is equal to said second higher value and that said first lower value is less than said second lower value;

(I) producing, as said first right-shift amount, a shift amount of zero (I1) when the first result of comparison indicates that said first higher value is greater than said second higher value or (I2) when the first and the fourth results of comparison indicate that said first higher value is equal to said second higher value and that said first lower value is not less than said second lower value;

(J) producing, as said second right-shift amount, the shift amount of zero (J1) when the first result of comparison indicates that said first higher value is less than said second higher value or (J2) when the first and the fourth results of comparison indicate that said first higher value is equal to said second higher value and that said first lower value is not greater than said second lower value;

(Ka) subtracting said second lower number from said first lower number to produce, as said second right-shift amount, a second result of subtraction (Ka1) when the third and the sixth results of comparison indicate that said first higher value is equal to said second higher value plus one and that said first lower value is not greater than said second lower value or (Ka2) when the first and the fourth results of comparison indicate that said first higher value is equal to said second higher value and that said first lower value is greater than said second lower value; and (La) producing, as said second right-shift amount, the shift amount exceeding said first predetermined natural number (La1) when the first and the third results of comparison indicate that said first higher value is greater than said second higher value and that said first higher value is not equal to said second higher value plus one or (La2) when the third and the sixth result of comparison indicate that said first higher value is equal to said second higher value plus one and that said first lower value is greater than said second lower value.

18. A method of calculating a shift amount for use in a floating-point arithmetic unit performing floating-point arithmetic of first and second input data which are represented by a floating-point representation and composed of first and second exponent parts and first and second mantissa parts, each of said first and said second mantissa parts being N bits long, where N represents a first predetermined natural number which is greater than $2^{n-1}$ and is not greater than $2^n$, where n represents a predetermined positive integer, each of said first and said second exponent parts being M bits long, where M represents a second predetermined natural number which is greater than said predetermined positive integer plus one, said shift amount being required for equalizing the floating-point of said first and said second mantissa parts, said shift amount consisting of first and second right-shift amounts for use rightwards shifting said first and said second mantissa parts, respectively, said method comprising the steps of:

(A) comparing higher (M−n) bits of said first exponent part with the higher (M−n) bits of said second exponent part to provide a first result of comparison by judging whether a first higher value is represented by the higher (M−n) bits of said first exponent part to be less than, equal to, or greater than a second higher value represented by the higher (M−n) bits of said second exponent part;

(B) comparing the higher (M−n) bits of said first exponent part with the higher (M−n) bits of said second exponent part when said first higher value is less than said second higher value to provide a second result of comparison by judging whether or not said second higher value is equal to said first higher value plus one;

(C) comparing the higher (M−n) bits of said first exponent part with the higher (M−n) bits of said second exponent part when said first higher value is greater than said second higher value to provide a third result of comparison by judging whether or not said first higher value is equal to said second higher value plus one;

(D) comparing lower n bits of said first exponent part with the lower n bits of said second exponent part when said first higher value is equal to said second higher value to provide a fourth result of comparison by judging whether a first lower value is represented by the lower n bits of said first exponent part to be less than, equal to, or greater than a second lower value represented by the lower n bits of said second exponent part;

(E) comparing the lower n bits of said first exponent part with the lower n bits of said second exponent part when said second higher value is equal to said first higher value plus one to provide a fifth result of comparison by judging whether said first lower value is less than, equal to, or greater than said second lower value;

(F) comparing the lower n bits of said first exponent part with the lower n bits of said second exponent part when said first higher value is equal to said second higher value plus one to provide a sixth result of comparison by judging whether said first lower value is less than, equal to, or greater than said second lower value;

(G) producing, as said first right-shift amount, a shift amount exceeding said first predetermined natural number (G1) when the first and the second results of comparison indicate that said first higher value is less than said second higher value and that said second higher value is not equal to said first higher value plus one or (G2) when the second and the fifth results of comparison indicate that said second higher value is equal to said first higher value plus one and that said first lower value is not greater than said second lower value;

(Hb) subtracting a first lower number represented by lower (n+1) bits of said first exponent part from a second lower number represented by the lower (n+1) bits of said first exponent part to produce, as said first right-shift amount, a first result of subtraction (Hb1) when the second and the fifth results of comparison indicate that said second higher value is equal to said first higher value plus one and that said first lower value is greater than said second lower value or (Hb2) when the first and the fourth results of comparison indicate that said first higher value is equal to said second higher value and that said first lower value is not greater than said second lower value;

(Ia) producing, as said first right-shift amount, a shift amount of zero (Ia1) when the first result of comparison indicates that said first higher value is greater than said second higher value or (Ia2) when the first and the fourth results of comparison indicate that said first higher value is equal to said second higher value and that said first lower value is greater than said second lower value;

(J) producing, as said second right-shift amount, the shift amount of zero (J1) when the first result of comparison indicates that said first higher value is less than said second higher value or (J2) when the first and the fourth results of comparison indicate that said first higher value is equal to said second higher and that said first lower value is not greater than said second lower value;

(K) subtracting said second lower number from said first lower number to produce, as said second right-shift amount, a second result of subtraction (K1) when the third and the sixth results of comparison indicate that said first higher value is equal to said second higher value plus one and that said first lower value is less than said second lower value or (K2) when the first and the fourth results of comparison indicate that said first higher value is equal to said second higher value and that said first lower value is greater than said second lower value; and (L) producing, as said second right-shift amount, the shift amount exceeding said first predetermined natural number (L1) when the first and the third results of comparison indicate that said first higher value is greater than said second higher value and that said first higher value is not equal to said second higher value plus one or (L2) when the third and the sixth result of comparison indicate that said first higher value is equal to said second higher value plus one and that said first lower value is not less than said second lower value.

19. A method of calculating a shift amount for use in a floating-point arithmetic unit performing floating-point arithmetic of first and second input data which are represented by a floating-point representation and composed of first and second exponent parts and first and second mantissa parts, each of said first and said second mantissa parts being N bits long, where N represents a first predetermined natural number which is greater than $2^{n-1}$ and is not greater than $2^n$, where n represents a predetermined positive integer, each of said first and said second exponent parts being M bits long, where M represents a second predetermined natural number which is greater than said predetermined positive integer plus one, said shift amount being required for equalizing the floating-point of said first and said second mantissa parts, said shift amount consisting of first and second right-shift amounts for use rightwards shifting said first and said second mantissa parts, respectively, said method comprising the steps of:

(A) comparing higher (M−n) bits of said first exponent part with the higher (M−n) bits of said second exponent part to provide a first result of comparison by judging whether a first higher value is represented by the higher (M−n) bits of said first exponent part to be less than, equal to, or greater than a second higher value represented by the higher (M−n) bits of said second exponent part;

(B) comparing the higher (M−n) bits of said first exponent part with the higher (M−n) bits of said second exponent part when said first higher value is less than said second higher value to provide a second result of comparison by judging whether or not said second higher value is equal to said first higher value plus one;

(C) comparing the higher (M−n) bits of said first exponent part with the higher (M−n) bits of said second exponent part when said first higher value is greater than said second higher value to provide a third result of comparison by judging whether or not said first higher value is equal to said second higher value plus one;

(D) comparing lower n bits of said first exponent part with the lower n bits of said second exponent part when said first higher value is equal to said second higher value to provide a fourth result of comparison by judging whether a first lower value is represented by the lower n bits of said first exponent part to be less than, equal to, or greater than a second lower value represented by the lower n bits of said second exponent part;

(E) comparing the lower n bits of said first exponent part with the lower n bits of said second exponent part when said second higher value is equal to said first higher value plus one to provide a fifth result of comparison by judging whether said first lower value is less than, equal to, or greater than said second lower value;

(F) comparing the lower n bits of said first exponent part with the lower n bits of said second exponent part when said first higher value is equal to said second higher value plus one to provide a sixth result of comparison by judging whether said first lower value is less than, equal to, or greater than said second lower value;

(G) producing, as said first right-shift amount, a shift amount exceeding said first predetermined natural number (G1) when the first and the second results of comparison indicate that said first higher value is less than said second higher value and that said second higher value is not equal to said first higher value plus one or (G2) when the second and the fifth results of comparison indicate that said second higher value is equal to said first higher value plus one and that said first lower value is not greater than said second lower value;

(H) subtracting a first lower number represented by lower (n+1) bits of said first exponent part from a second lower number represented by the lower $(n+1)$ bits of said first exponent part to produce, as said first right-shift amount, a first result of subtraction (H1) when the second and the fifth results of comparison indicate that said second higher value is equal to said first higher value plus one and that said first lower value is greater than said second lower value or (H2) when the first and the fourth results of comparison indicate that said first higher value is equal to said second higher value and that said first lower value is less than said second lower value;

(I) producing, as said first right-shift amount, a shift amount of zero (I1) when the first result of comparison indicates that said first higher value is greater than said second higher value or (I2) when the first and the fourth results of comparison indicate that said first higher value is equal to said second higher value and that said first lower value is not less than said second lower value;

(Ja) producing, as said second right-shift amount, the shift amount of zero (Ja1) when the first result of comparison indicates that said first higher value is less than said second higher value or (Ja2) when the first and the fourth results of comparison indicate that said first higher value is equal to said second higher value and that said first lower value is less than said second lower value;

(Kb) subtracting said second lower number from said first lower number to produce, as said second right-shift amount, a second result of subtraction (Kb1) when the third and the sixth results of comparison indicate that said first higher value is equal to said second higher value plus one and that said first lower value is less than said second lower value or (Kb2) when the first and the fourth results of comparison indicate that said first higher value is equal to said second higher value and that said first lower value is not less than said second lower value; and (L) producing, as said second right-shift amount, the shift amount exceeding said first predetermined natural number (L1) when the first and the third results of comparison indicate that said first higher value is greater than said second higher value and that said first higher value is not equal to said second higher value plus one or (L2) when the third and the sixth result of comparison indicate that said first higher value is equal to said second higher value plus one and that said first lower value is not less than said second lower value.

20. A method of calculating a shift amount for use in a floating-point arithmetic unit performing floating-point arithmetic of first and second input data which are represented by a floating-point representation and composed of first and second exponent parts and first and second mantissa parts, each of said first and said second mantissa parts being N bits long, where N represents a first predetermined natural number which is greater than $2^{n-1}$ and is not greater than $2^n$, where n represents a predetermined positive integer, each of said first and said second exponent parts being M bits long, where M represents a second predetermined natural number which is greater than said predetermined positive integer plus one, said shift amount being required for equalizing the floating-point of said first and said second mantissa parts, said shift amount consisting of first and second right-shift amounts for use rightwards shifting said first and said second mantissa parts, respectively, said method comprising the steps of:

(A) comparing higher $(M-n)$ bits of said first exponent part with the higher $(M-n)$ bits of said second exponent part to provide a first result of comparison by judging whether a first higher value is represented by the higher $(M-n)$ bits of said first exponent part to be less than, equal to, or greater than a second higher value represented by the higher $(M-n)$ bits of said second exponent part;

(B) comparing the higher $(M-n)$ bits of said first exponent part with the higher $(M-n)$ bits of said second exponent part when said first higher value is less than said second higher value to provide a second result of comparison by judging whether or not said second higher value is equal to said first higher value plus one;

(C) comparing the higher $(M-n)$ bits of said first exponent part with the higher $(M-n)$ bits of said second exponent part when said first higher value is greater than said second higher value to provide a third result of comparison by judging whether or not said first higher value is equal to said second higher value plus one;

(D) comparing lower n bits of said first exponent part with the lower n bits of said second exponent part when said first higher value is equal to said second higher value to provide a fourth result of comparison by judging whether a first lower value is represented by the lower n bits of said first exponent part to be less than, equal to, or greater than a second lower value represented by the lower n bits of said second exponent part;

(E) comparing the lower n bits of said first exponent part with the lower n bits of said second exponent part when said second higher value is equal to said first higher value plus one to provide a fifth result of comparison by judging whether said first lower value is less than, equal to, or greater than said second lower value;

(F) comparing the lower n bits of said first exponent part with the lower n bits of said second exponent part when said first higher value is equal to said second higher value plus one to provide a sixth result of comparison by judging whether said first lower value is less than, equal to, or greater than said second lower value;

(G) producing, as said first right-shift amount, a shift amount exceeding said first predetermined natural number (G1) when the first and the second results of comparison indicate that said first higher value is less than said second higher value and that said second higher value is not equal to said first higher value plus one or (G2) when the second and the fifth results of comparison indicate that said second higher value is equal to said first higher value plus one and that said first lower value is not greater than said second lower value;

(Hb) subtracting a first lower number represented by lower $(n+1)$ bits of said first exponent part from a second lower number represented by the lower $(n+1)$ bits of said first exponent part to produce, as said first right-shift amount, a first result of subtraction (Hb1) when the second and the fifth results of comparison indicate that said second higher value is equal to said first higher value plus one and that said first lower value is greater than said second lower value or (Hb2) when the first and the fourth results of comparison indicate that said first higher value is equal to said second higher value and that said first lower value is not greater than said second lower value;

(Ia) producing, as said first right-shift amount, a shift amount of zero (Ia1) when the first result of comparison indicates that said first higher value is greater than said second higher value or (Ia2) when the first and the fourth results of comparison indicate that said first higher value is equal to said second higher value and that said first lower value is greater than said second lower value;

(Ja) producing, as said second right-shift amount, the shift amount of zero (Ja1) when the first result of comparison indicates that said first higher value is less than said second higher value or (Ja2) when the first and the fourth results of comparison indicate that said first higher value is equal to said second higher value and that said first lower value is less than said second lower value;

(Kb) subtracting said second lower number from said first lower number to produce, as said second right-shift amount, a second result of subtraction (Kb1) when the third and the sixth results of comparison indicate that said first higher value is equal to said second higher value plus one and that said first lower value is less than said second lower value or (Kb2) when the first and the fourth results of comparison indicate that said first higher value is equal to said second higher value and that said first lower value is not less than said second lower value; and (L) producing, as said second right-shift amount, the shift amount exceeding said first predetermined natural number (L1) when the first and the third results of comparison indicate that said first higher value is greater than said second higher value and that said first higher value is not equal to said second higher value plus one or (L2) when the third and the sixth result of comparison indicate that said first higher value is equal to said second higher value plus one and that said first lower value is not less than said second lower value.

21. A method of calculating a shift amount for use in a floating-point arithmetic unit performing floating-point arithmetic of first and second input data which are represented by a floating-point representation and composed of first and second exponent parts and first and second mantissa parts, each of said first and second mantissa parts being N bits long, where N represents a first predetermined natural number which is greater than $2^{n-1}$ and is not greater than $2^n$, where n represents a predetermined positive integer, each of said first and said second exponent parts being M bits long, where M represents a second predetermined natural number which is greater than said predetermined positive integer plus one, said shift amount being required for equalizing the floating-point of said first and said second mantissa parts, said shift amount consisting of first and second right-shift amounts for use rightwards shifting said first and said second mantissa parts, respectively, said method comprising the steps of:

(A) comparing higher (M−n) bits of said first exponent part with the higher (M−n) bits of said second exponent part to provide a first result of comparison by judging whether a first higher value is represented by the higher (M−n) bits of said first exponent part to be less than, equal to, or greater than a second higher value represented by the higher (M−n) bits of said second exponent part;

(B) comparing the higher (M−n) bits of said first exponent part with the higher (M−n) bits of said second exponent part when said first higher value is less than said second higher value to provide a second result of comparison by judging whether or not said second higher value is equal to said first higher value plus one;

(C) comparing the higher (M−n) bits of said first exponent part with the higher (M−n) bits of said second exponent part when said first higher value is greater than said second higher value to provide a third result of comparison by judging whether or not said first higher value is equal to said second higher value plus one;

(D) comparing lower n bits of said first exponent part with the lower n bits of said second exponent part when said first higher value is equal to said second higher value to provide a fourth result of comparison by judging whether a first lower value is represented by the lower n bits of said first exponent part to be less than, equal to, or greater than a second lower value represented by the lower n bits of said second exponent part;

(E) comparing the lower n bits of said first exponent part with the lower n bits of said second exponent part when said second higher value is equal to said first higher value plus one to provide a fifth result of comparison by judging whether said first lower value is less than, equal to, or greater than said second lower value;

(F) comparing the lower n bits of said first exponent part with the lower n bits of said second exponent part when said first higher value is equal to said second higher value plus one to provide a sixth result of comparison by judging whether said first lower value is less than, equal to, or greater than said second lower value;

(Ga) producing, as said first right-shift amount, a shift amount exceeding said first predetermined natural number (Ga1) when the first and the second results of comparison indicate that said first higher value is less than said second higher value and that said second higher value is not equal to said first higher value plus one or (Ga2) when the second and the fifth results of comparison indicate that said second higher value is equal to said first higher value plus one and that said first lower value is less than said second lower value;

(Hc) subtracting a first lower number represented by lower (n+1) bits of said first exponent part from a second lower number represented by the lower (n+1) bits of said first exponent part to produce, as said first right-shift amount, a first result of subtraction (Hc1) when the second and the fifth results of comparison indicate that said second higher value is equal to said first higher value plus one and that said first lower value is not less than said second lower value or (Hc2) when the first and the fourth results of comparison indicate that said first higher value is equal to said second higher value and that said first lower value is not greater than said second lower value;

(Ia) producing, as said first right-shift amount, a shift amount of zero (Ia1) when the first result of comparison indicates that said first higher value is greater than said second higher value or (Ia2) when the first and the fourth results of comparison indicate that said first higher value is equal to said second higher value and that said first lower value is greater than said second lower value;

(J) producing, as said second right-shift amount, the shift amount of zero (J1) when the first result of comparison indicates that said first higher value is less than said second higher value or (J2) when the first and the fourth results of comparison indicate that said first higher value is equal to said second higher value and that said first lower value is not greater than said second lower value;

(K) subtracting said second lower number from said first lower number to produce, as said second right-shift amount, a second result of subtraction (K1) when the third and the sixth results of comparison indicate that said first higher value is equal to said second higher value plus one and that said first lower value is less than said second lower value or (K2) when the first and the fourth results of comparison indicate that said first higher value is equal to said second higher value and that said first lower value is greater than said second lower value; and (L) producing, as said second right-shift amount, the shift amount exceeding said first predetermined natural number (L1) when the first and the third results of comparison indicate that said first higher value is greater than said second higher value and that said first higher value is not equal to second higher value plus one or (L2) when the third and the sixth result of comparison indicate that said first higher value is equal to said second higher value plus one and that said first lower value is not less than said second lower value.

22. A method of calculating a shift amount for use in a floating-point arithmetic unit performing floating-point arithmetic of first and second input data which are represented by a floating-point representation and composed of first and second exponent parts and first and second mantissa parts, each of said first and said second mantissa parts being N bits long, where N represents a first predetermined natural number which is greater than $2^{n-1}$ and is not greater than $2^n$, where n represents a predetermined positive integer, each of said first and said second exponent parts being M bits long, where M represents a second predetermined natural number which is greater than said predetermined positive integer plus one, said shift amount being required for equalizing the floating-point of said first and said second mantissa parts, said shift amount consisting of first and second right-shift amounts for use rightwards shifting said first and said second mantissa parts, respectively, said method comprising the steps of:

(A) comparing higher (M−n) bits of said first exponent part with the higher (M−n) bits of said second exponent part to provide a first result of comparison by judging whether a first higher value is represented by the higher (M−n) bits of said first exponent part to be less than, equal to, or greater than a second higher value represented by the higher (M−n) bits of said second exponent part;

(B) comparing the higher (M−n) bits of said first exponent part with the higher (M−n) bits of said second exponent part when said first higher value is less than said second higher value to provide a second result of comparison by judging whether or not said second higher value is equal to said first higher value plus one;

(C) comparing the higher (M−n) bits of said first exponent part with the higher (M−n) bits of said second exponent part when said first higher value is greater than said second higher value to provide a third result of comparison by judging whether or not said first higher value is equal to said second higher value plus one;

(D) comparing lower n bits of said first exponent part with the lower n bits of said second exponent part when said first higher value is equal to said second higher value to provide a fourth result of comparison by judging whether a first lower value is represented by the lower n bits of said first exponent part to be less than, equal to, or greater than a second lower value represented by the lower n bits of said second exponent part;

(E) comparing the lower n bits of said first exponent part with the lower n bits of said second exponent part when said second higher value is equal to said first higher value plus one to provide a fifth result of comparison by judging whether said first lower value is less than, equal to, or greater than said second lower value;

(F) comparing the lower n bits of said first exponent part with the lower n bits of said second exponent part when said first higher value is equal to said second higher value plus one to provide a sixth result of comparison by judging whether said first lower value is less than, equal to, or greater than said second lower value;

(G) producing, as said first right-shift amount, a shift amount exceeding said first predetermined natural number (G1) when the first and the second results of comparison indicate that said first higher value is less than said second higher value and that said second higher value is not equal to said first higher value plus one or (G2) when the second and the fifth results of comparison indicate that said second higher value is equal to said first higher value plus one and that said first lower value is not greater than said second lower value;

(H) subtracting a first lower number represented by lower (n+1) bits of said first exponent part from a second lower number represented by the lower (n+1) bits of said first exponent part to produce, as said first right-shift amount, a first result of subtraction (H1) when the second and the fifth results of comparison indicate that said second higher value is equal to said first higher value plus one and that said first lower value is greater than said second lower value or (H2) when the first and the fourth results of comparison indicate that said first higher value is equal to said second higher value and that said first lower value is less than said second lower value;

(I) producing, as said first right-shift amount, a shift amount of zero (I1) when the first result of comparison indicates that said first higher value is greater than said second higher value or (I2) when the first and the fourth results of comparison indicate that said first higher value is equal to said second higher value and that said first lower value is not less than said second lower value;

(Ja) producing, as said second right-shift amount, the shift amount of zero (Ja1) when the first result of comparison indicates that said first higher value is less than said second higher value or (Ja2) when the first and the fourth results of comparison indicate that said first higher value is equal to said second higher value and that said first lower value is less than said second lower value;

(Kc) subtracting said second lower number from said first lower number to produce, as said second right-shift amount, a second result of subtraction (Kc1) when the third and the sixth results of comparison indicate that said first higher value is equal to said second higher value plus one and that said first lower value is not greater than said second lower value or (Kc2) when the first and the fourth results of comparison indicate that said first higher value is equal to said second higher value and that said first lower value is not less than said second lower value; and (La) producing, as said second right-shift amount, the shift amount exceeding said first predetermined natural number (La1) when the first and the third results of comparison indicate that said first higher value is greater than said second higher value and that said first higher value is not equal to said second higher value plus one or (La2) when the third and the sixth result of comparison indicate that said first higher value is equal to said second higher value plus one and that said first lower value is greater than said second lower value.

23. A method of calculating a shift amount for use in a floating-point arithmetic unit performing floating-point arithmetic of first and second input data which are represented by a floating-point representation and composed of first and second exponent parts and first and second mantissa parts, each of said first and said second mantissa parts being N bits long, where N represents a first predetermined natural number which is greater than $2^{n-1}$ and is not greater than $2^n$, where n represents a predetermined positive integer, each of said first and said second exponent parts being M bits long, where M represents a second predetermined natural number which is greater than said predetermined positive integer plus one, said shift amount being required for equalizing the floating-point of said first and said second mantissa parts, said shift amount consisting of first and second right-shift amounts for use rightwards shifting said first and said second mantissa parts, respectively, said method comprising the steps of:

(A) comparing higher (M−n) bits of said first exponent part with the higher (M−n) bits of said second exponent part to provide a first result of comparison by judging whether a first higher value is represented by the higher (M−n) bits of said first exponent part to be less than, equal to, or greater than a second higher value represented by the higher (M−n) bits of said second exponent part;

(B) comparing the higher (M−n) bits of said first exponent part with the higher (M−n) bits of said second exponent part when said first higher value is less than said second higher value to provide a second result of comparison by judging whether or not said second higher value is equal to said first higher value plus one;

(C) comparing the higher (M−n) bits of said first exponent part with the higher (M−n) bits of said second exponent part when said first higher value is greater than said second higher value to provide a third result of comparison by judging whether or not said first higher value is equal to said second higher value plus one;

(D) comparing lower n bits of said first exponent part with the lower n bits of said second exponent part when said first higher value is equal to said second higher value to provide a fourth result of comparison by judging whether a first lower value is represented by the lower n bits of said first exponent part to be less than, equal to, or greater than a second lower value represented by the lower n bits of said second exponent part;

(E) comparing the lower n bits of said first exponent part with the lower n bits of said second exponent part when said second higher value is equal to said first higher value plus one to provide a fifth result of comparison by judging whether said first lower value is less than, equal to, or greater than said second lower value;

(F) comparing the lower n bits of said first exponent part with the lower n bits of said second exponent part when said first higher value is equal to said second higher value plus one to provide a sixth result of comparison by judging whether said first lower value is less than, equal to, or greater than said second lower value;

(Ga) producing, as said first right-shift amount, a shift amount exceeding said first predetermined natural number (Ga1) when the first and the second results of comparison indicate that said first higher value is less than said second higher value and that said second higher value is not equal to said first higher value plus one or (Ga2) when the second and the fifth results of comparison indicate that said second higher value is equal to said first higher value plus one and that said first lower value is less than said second lower value;

(Hc) subtracting a first lower number represented by lower (n+1) bits of said first exponent part from a second lower number represented by the lower (n+1) bits of said first exponent part to produce, as said first right-shift amount, a first result of subtraction (Hc1) when the second and the fifth results of comparison indicate that said second higher value is equal to said first higher value plus one and that said first lower value is not less than said second lower value or (Hc2) when the first and the fourth results of comparison indicate that said first higher value is equal to said second higher value and that said first lower value is not greater than said second lower value;

(Ia) producing, as said first right-shift amount, a shift amount of zero (Ia1) when the first result of comparison indicates that said first higher value is greater than said second higher value or (Ia2) when the first and the fourth results of comparison indicate that said first higher value is equal to said second higher value and that said first lower value is greater than said second lower value;

(J) producing, as said second right-shift amount, the shift amount of zero (J1) when the first result of comparison indicates that said first higher value is less than said second higher value or (J2) when the first and the fourth results of comparison indicate that said first higher value is equal to said second higher value and that said first lower value is not greater than said second lower value;

(Ka) subtracting said second lower number from said first lower number to produce, as said second right-shift amount, a second result of subtraction (Ka1) when the third and the sixth results of comparison indicate that said first higher value is equal to said second higher value plus one and that said first lower value is not greater than said second lower value or (Ka2) when the first and the fourth results of comparison indicate that said first higher value is equal to said second higher value and that said first lower value is greater than said second lower value; and (La) producing, as said second right-shift amount, the shift amount exceeding said first predetermined natural number (La1) when the first and the third results of comparison indicate that said first higher value is greater than said second higher value and that said first higher value is not equal to said second higher value plus one or (La2) when the third and the sixth result of comparison indicate that said first higher value is equal to said second higher value plus one and that said first lower value is greater than said second lower value.

24. A method of calculating a shift amount for use in a floating-point arithmetic unit performing floating-point arithmetic of first and second input data which are represented by a floating-point representation and composed of first and second exponent parts and first and second mantissa parts, each of said first and said second mantissa parts being N bits long, where N represents a first predetermined natural number which is greater than $2^{n-1}$ and is not greater than $2^n$, where n represents a predetermined positive integer, each of said first and said second exponent parts being M bits long, where M represents a second predetermined natural number which is greater than said predetermined positive integer plus one, said shift amount being required for equalizing the floating-point of said first and said second mantissa parts, said shift amount consisting of first and second right-shift amounts for use rightwards shifting said first and said second mantissa parts, respectively, said method comprising the steps of:

(A) comparing higher (M−n) bits of said first exponent part with the higher (M−n) bits of said second exponent part to provide a first result of comparison by judging whether a first higher value is represented by the higher (M−n) bits of said first exponent part to be less than, equal to, or greater than a second higher value represented by the higher (M−n) bits of said second exponent part;

(B) comparing the higher (M−n) bits of said first exponent part with the higher (M−n) bits of said second exponent part when said first higher value is less than said second higher value to provide a second result of comparison by judging whether or not said second higher value is equal to said first higher value plus one;

(C) comparing the higher (M−n) bits of said first exponent part with the higher (M−n) bits of said second exponent part when said first higher value is greater than said second higher value to provide a third result of comparison by judging whether or not said first higher value is equal to said second higher value plus one;

(D) comparing lower n bits of said first exponent part with the lower n bits of said second exponent part when said first higher value is equal to said second higher value to provide a fourth result of comparison by judging whether a first lower value is represented by the lower n bits of said first exponent part to be less than, equal to, or greater than a second lower value represented by the lower n bits of said second exponent part;

(E) comparing the lower n bits of said first exponent part with the lower n bits of said second exponent part when said second higher value is equal to said first higher value plus one to provide a fifth result of comparison by judging whether said first lower value is less than, equal to, or greater than said second lower value;

(F) comparing the lower n bits of said first exponent part with the lower n bits of said second exponent part when said first higher value is equal to said second higher value plus one to provide a sixth result of comparison by judging whether said first lower value is less than, equal to, or greater than said second lower value;

(Ga) producing, as said first right-shift amount, a shift amount exceeding said first predetermined natural number (Ga1) when the first and the second results of comparison indicate that said first higher value is less than said second higher value and that said second higher value is not equal to said first higher value plus one or (Ga2) when the second and the fifth results of comparison indicate that said second higher value is equal to said first higher value plus one and that said first lower value is less than said second lower value;

(Ha) subtracting a first lower number represented by lower (n+1) bits of said first exponent part from a second lower number represented by the lower (n+1) bits of said first exponent part to produce, as said first right-shift amount, a first result of subtraction (Ha1) when the second and the fifth results of comparison indicate that said second higher value is equal to said first higher value plus one and that said first lower value is not less than said second lower value or (Ha2) when the first and the fourth results of comparison indicate that said first higher value is equal to said second higher value and that said first lower value is less than said second lower value;

(I) producing, as said first right-shift amount, a shift amount of zero (I1) when the first result of comparison indicates that said first higher value is greater than said second higher value or (I2) when the first and the fourth results of comparison indicate that said first higher value is equal to said second higher value and that said first lower value is not less than said second lower value;

(Ja) producing, as said second right-shift amount, the shift amount of zero (Ja1) when the first result of comparison indicates that said first higher value is less than said second higher value or (Ja2) when the first and the fourth results of comparison indicate that said first higher value is equal to said second higher value and that said first lower value is less than said second lower value;

(Kc) subtracting said second lower number from said first lower number to produce, as said second right-shift amount, a second result of subtraction (Kc1) when the third and the sixth results of comparison indicate that said first higher value is equal to said second higher value plus one and that said first lower value is not greater than said second lower value or (Kc2) when the first and the fourth results of comparison indicate that said first higher value is equal to said second higher value and that said first lower value is not less than said second lower value; and (La) producing, as said second right-shift amount, the shift amount exceeding said first predetermined natural number (La1) when the first and the third results of comparison indicate that said first higher value is greater than said second higher value and that said first higher value is not equal to said second higher value plus one or (La2) when the third and the sixth result of comparison indicate that said first higher value is equal to said second higher value plus one and that said first lower value is greater than said second lower value.

25. A method of calculating a shift amount for use in a floating-point arithmetic unit performing floating-point arithmetic of first and second input data which are represented by a floating-point representation and composed of first and second exponent parts and first and second mantissa parts, each of said first and said second mantissa parts being N bits long, where N represents a first predetermined natural number which is greater than $2^{n-1}$ and is not greater than $2^n$, where n represents a predetermined positive integer, each of said first and said second exponent parts being M bits long, where M represents a second predetermined natural number which is greater than said predetermined positive integer plus one, said shift amount being required for equalizing the floating-point of said first and said second mantissa parts, said shift amount consisting of first and second right-shift amounts for use rightwards shifting said first and said second mantissa parts, respectively, said method comprising the steps of:

(A) comparing higher (M−n) bits of said first exponent part with the higher (M−n) bits of said second exponent part to provide a first result of comparison by judging whether a first higher value is represented by the higher (M−n) bits of said first exponent part to be less than, equal to, or greater than a second higher value represented by the higher (M−n) bits of said second exponent part;

(B) comparing the higher (M−n) bits of said first exponent part with the higher (M−n) bits of said second exponent part when said first higher value is less than said second higher value to provide a second result of comparison by judging whether or not said second higher value is equal to said first higher value plus one;

(C) comparing the higher (M−n) bits of said first exponent part with the higher (M−n) bits of said second exponent part when said first higher value is greater than said second higher value to provide a third result of comparison by judging whether or not said first higher value is equal to said second higher value plus one;

(D) comparing lower n bits of said first exponent part with the lower n bits of said second exponent part when said first higher value is equal to said second higher value to provide a fourth result of comparison by judging whether a first lower value is represented by the lower n bits of said first exponent part to be less than, equal to, or greater than a second lower value represented by the lower n bits of said second exponent part;

(E) comparing the lower n bits of said first exponent part with the lower n bits of said second exponent part when said second higher value is equal to said first higher value plus one to provide a fifth result of comparison by judging whether said first lower value is less than, equal to, or greater than said second lower value;

(F) comparing the lower n bits of said first exponent part with the lower n bits of said second exponent part when said first higher value is equal to said second higher value plus one to provide a sixth result of comparison by judging whether said first lower value is less than, equal to, or greater than said second lower value;

(Ga) producing, as said first right-shift amount, a shift amount exceeding said first predetermined natural number (Ga1) when the first and the second results of comparison indicate that said first higher value is less than said second higher value and that said second higher value is not equal to said first higher value plus one or (Ga2) when the second and the fifth results of comparison indicate that said second higher value is equal to said first higher value plus one and that said first lower value is less than said second lower value;

(Hc) subtracting a first lower number represented by lower (n+1) bits of said first exponent part from a second lower number represented by the lower (n+1) bits of said first exponent part to produce, as said first right-shift amount, a first result of subtraction (Hc1) when the second and the fifth results of comparison indicate that said second higher value is equal to said first higher value plus one and that said first lower value is not less than said second lower value or (Hc2) when the first and the fourth results of comparison indicate that said first higher value is equal to said second higher value and that said first lower value is not greater than said second lower value;

(Ia) producing, as said first right-shift amount, a shift amount of zero (Ia1) when the first result of comparison indicates that said first higher value is greater than said second higher value or (Ia2) when the first and the fourth results of comparison indicate that said first higher value is equal to said second higher value and that said first lower value is greater than said second lower value;

(Ja) producing, as said second right-shift amount, the shift amount of zero (Ja1) when the first result of comparison indicates that said first higher value is less than said second higher value or (Ja2) when the first and the fourth results of comparison indicate that said first higher value is equal to said second higher value and that said first lower value is less than said second lower value;

(Kb) subtracting said second lower number from said first lower number to produce, as said second right-shift amount, a second result of subtraction (Kb1) when the third and the sixth results of comparison indicate that said first higher value is equal to said second higher value plus one and that said first lower value is less than said second lower value or (Kb2) when the first and the fourth results of comparison indicate that said first higher value is equal to said second higher value and that said first lower value is not less than said second lower value; and (L) producing, as said second right-shift amount, the shift amount exceeding said first predetermined natural number (L1) when the first and the third results of comparison indicate that said first higher value is greater than said second higher value and that said first higher value is not equal to said second higher value plus one or (L2) when the third and the sixth result of comparison indicate that said first higher value is equal to said second higher value plus one and that said first lower value is not less than said second lower value.

26. A method of calculating a shift amount for use in a floating-point arithmetic unit performing floating-point arithmetic of first and second input data which are represented by a floating-point representation and composed of first and second exponent parts and first and second mantissa parts, each of said first and said second mantissa parts being N bits long, where N represents a first predetermined natural number which is greater than $2^{n-1}$ and is not greater than $2^n$, where n represents a predetermined positive integer, each of said first and said second exponent parts being M bits long, where M represents a second predetermined natural number which is greater than said predetermined positive integer plus one, said shift amount being required for equalizing the floating-point of said first and said second mantissa parts, said shift amount consisting of first and second right-shift amounts for use rightwards shifting said first and said second mantissa parts, respectively, said method comprising the steps of:

(A) comparing higher (M−n) bits of said first exponent part with the higher (M−n) bits of said second exponent part to provide a first result of comparison by judging whether a first higher value is represented by the higher (M−n) bits of said first exponent part to be less than, equal to, or greater than a second higher value represented by the higher (M−n) bits of said second exponent part;

(B) comparing the higher (M−n) bits of said first exponent part with the higher (M−n) bits of said second exponent part when said first higher value is less than said second higher value to provide a second result of comparison by judging whether or not said second higher value is equal to said first higher value plus one;

(C) comparing the higher (M−n) bits of said first exponent part with the higher (M−n) bits of said second exponent part when said first higher value is greater than said second higher value to provide a third result of comparison by judging whether or not said first higher value is equal to said second higher value plus one;

(D) comparing lower n bits of said first exponent part with the lower n bits of said second exponent part when said first higher value is equal to said second higher value to provide a fourth result of comparison by judging whether a first lower value is represented by the lower n bits of said first exponent part to be less than, equal to, or greater than a second lower value represented by the lower n bits of said second exponent part;

(E) comparing the lower n bits of said first exponent part with the lower n bits of said second exponent part when said second higher value is equal to said first higher value plus one to provide a fifth result of comparison by judging whether said first lower value is less than, equal to, or greater than said second lower value;

(F) comparing the lower n bits of said first exponent part with the lower n bits of said second exponent part when said first higher value is equal to said second higher value plus one to provide a sixth result of comparison by judging whether said first lower value is less than, equal to, or greater than said second lower value;

(G) producing, as said first right-shift amount, a shift amount exceeding said first predetermined natural number (G1) when the first and the second results of comparison indicate that said first higher value is less than said second higher value and that said second higher value is not equal to said first higher value plus one or (G2) when the second and the fifth results of comparison indicate that said second higher value is equal to said first higher value plus one and that said first lower value is not greater than said second lower value;

(Hb) subtracting a first lower number represented by lower (n+1) bits of said first exponent part from a second lower number represented by the lower (n+1) bits of said first exponent part to produce, as said first right-shift amount, a first result of subtraction (Hb1) when the second and the fifth results of comparison indicate that said second higher value is equal to said first higher value plus one and that said first lower value is greater than said second lower value or (Hb2) when the first and the fourth results of comparison indicate that said first higher value is equal to said second higher value and that said first lower value is not greater than said second lower value;

(Ia) producing, as said first right-shift amount, a shift amount of zero (Ia1) when the first result of comparison indicates that said first higher value is greater than said second higher value or (Ia2) when the first and the fourth results of comparison indicate that said first higher value is equal to said second higher value and that said first lower value is greater than said second lower value;

(Ja) producing, as said second right-shift amount, the shift amount of zero (Ja1) when the first result of comparison indicates that said first higher value is less than said second higher value or (Ja2) when the first and the fourth results of comparison indicate that said first higher value is equal to said second higher value and that said first lower value is less than said second lower value;

(Kc) subtracting said second lower number from said first lower number to produce, as said second right-shift amount, a second result of subtraction (Kc1) when the third and the sixth results of comparison indicate that said first higher value is equal to said second higher value plus one and that said first lower value is not greater than said second lower value or (Kc2) when the first and the fourth results of comparison indicate that said first higher value is equal to said second higher value and that said first lower value is not less than said second lower value; and (La) producing, as said second right-shift amount, the shift amount exceeding said first predetermined natural number (La1) when the first and the third results of comparison indicate that said first higher value is greater than said second higher value and that said first higher value is not equal to said second higher value plus one or (La2) when the third and the sixth result of comparison indicate that said first higher value is equal to said second higher value plus one and that said first lower value is greater than said second lower value.

27. A method of calculating a shift amount for use in a floating-point arithmetic unit performing floating-point arithmetic of first and second input data which are represented by a floating-point representation and composed of first and second exponent parts and first and second mantissa parts, each of said first and said second mantissa parts being N bits long, where N represents a first predetermined natural number which is greater than $2^{n-1}$ and is not greater than $2^n$, where n represents a predetermined positive integer, each of said first and said second exponent parts being M bits long, where M represents a second predetermined natural number which is greater than said predetermined positive integer plus one, said shift amount being required for equalizing the floating-point of said first and said second mantissa parts, said shift amount consisting of first and second right-shift amounts for use rightwards shifting said first and said second mantissa parts, respectively, said method comprising the steps of:

(A) comparing higher (M−n) bits of said first exponent part with the higher (M−n) bits of said second exponent part to provide a first result of comparison by judging whether a first higher value is represented by the higher (M−n) bits of said first exponent part to be less than, equal to, or greater than a second higher value represented by the higher (M−n) bits of said second exponent part;

(B) comparing the higher (M−n) bits of said first exponent part with the higher (M−n) bits of said second exponent part when said first higher value is less than said second higher value to provide a second result of comparison by judging whether or not said second higher value is equal to said first higher value plus one;

(C) comparing the higher (M−n) bits of said first exponent part with the higher (M−n) bits of said second exponent part when said first higher value is greater than said second higher value to provide a third result of comparison by judging whether or not said first higher value is equal to said second higher value plus one;

(D) comparing lower n bits of said first exponent part with the lower n bits of said second exponent part when said first higher value is equal to said second higher value to provide a fourth result of comparison by judging whether a first lower value is represented by the lower n bits of said first exponent part to be less than, equal to, or greater than a second lower value represented by the lower n bits of said second exponent part;

(E) comparing the lower n bits of said first exponent part with the lower n bits of said second exponent part when said second higher value is equal to said first higher value plus one to provide a fifth result of comparison by judging whether said first lower value is less than, equal to, or greater than said second lower value;

(F) comparing the lower n bits of said first exponent part with the lower n bits of said second exponent part when said first higher value is equal to said second higher value plus one to provide a sixth result of comparison by judging whether said first lower value is less than, equal to, or greater than said second lower value;

(Ga) producing, as said first right-shift amount, a shift amount exceeding said first predetermined natural number (Ga1) when the first and the second results of comparison indicate that said first higher value is less than said second higher value and that second higher value is not equal to said first higher value plus one or (Ga2) when the second and the fifth results of comparison indicate that said second higher value is equal to said first higher value plus one and that said first lower value is less than said second lower value;

(Ha) subtracting a first lower number represented by lower (n+1) bits of said first exponent part from a second lower number represented by the lower (n+1) bits of said first exponent part to produce, as said first right-shift amount, a first result of subtraction (Ha1) when the second and the fifth results of comparison indicate that said second higher value is equal to said first higher value plus one and that said first lower value is not less than said second lower value or (Ha2) when the first and the fourth results of comparison indicate that said first higher value is equal to said second higher value and that said first lower value is less than said second lower value;

(I) producing, as said first right-shift amount, a shift amount of zero (I1) when the first result of comparison indicates that said first higher value is greater than said second higher value or (I2) when the first and the fourth results of comparison indicate that said first higher value is equal to said second higher value and that said first lower value is not less than said second lower value;

(Ja) producing, as said second right-shift amount, the shift amount of zero (Ja1) when the first result of comparison indicates that said first higher value is less than said second higher value or (Ja2) when the first and the fourth results of comparison indicate that said first higher value is equal to said second higher value and that said first lower value is less than said second lower value;

(Kb) subtracting said second lower number from said first lower number to produce, as said second right-shift amount, a second result of subtraction (Kb1) when the third and the sixth results of comparison indicate that said first higher value is equal to said second higher value plus one and that said first lower value is less than said second lower value or (Kb2) when the first and the fourth results of comparison indicate that said first higher value is equal to said second higher value and that said first lower value is not less than said second lower value; and (L) producing, as said second right-shift amount, the shift amount exceeding said first predetermined natural number (L1) when the first and the third results of comparison indicate that said first higher value is greater than said second higher value and that said first higher value is not equal to said second higher value plus one or (L2) when the third and the sixth result of comparison indicate that said first higher value is equal to said second higher value plus one and that said first lower value is not less than said second lower value.

28. A method of calculating a shift amount for use in a floating-point arithmetic unit performing floating-point arithmetic of first and second input data which are represented by a floating-point representation and composed of first and second exponent parts and first and second mantissa parts, each of said first and said second mantissa parts being N bits long, where N represents a first predetermined natural number which is greater than $2^{n-1}$ and is not greater than $2^n$, where n represents a predetermined positive integer, each of said first and said second exponent parts being M bits long, where M represents a second predetermined natural number which is greater than said predetermined positive integer plus one, said shift amount being required for equalizing the floating-point of said first and said second mantissa parts, said shift amount consisting of first and second right-shift amounts for use rightwards shifting said first and said second mantissa parts, respectively, said method comprising the steps of:

(A) comparing higher (M−n) bits of said first exponent part with the higher (M−n) bits of said second exponent part to provide a first result of comparison by judging whether a first higher value is represented by the higher (M−n) bits of said first exponent part to be less than, equal to, or greater than a second higher value represented by the higher (M−n) bits of said second exponent part;

(B) comparing the higher (M−n) bits of said first exponent part with the higher (M−n) bits of said second exponent part when said first higher value is less than said second higher value to provide a second result of comparison by judging whether or not said second higher value is equal to said first higher value plus one;

(C) comparing the higher (M−n) bits of said first exponent part with the higher (M−n) bits of said second exponent part when said first higher value is greater than said second higher value to provide a third result of comparison by judging whether or not said first higher value is equal to said second higher value plus one;

(D) comparing lower n bits of said first exponent part with the lower n bits of said second exponent part when said first higher value is equal to said second higher value to provide a fourth result of comparison by judging whether a first lower value is represented by the lower n bits of said first exponent part to be less than, equal to, or greater than a second lower value represented by the lower n bits of said second exponent part;

(E) comparing the lower n bits of said first exponent part with the lower n bits of said second exponent part when said second higher value is equal to said first higher value plus one to provide a fifth result of comparison by judging whether said first lower value is less than, equal to, or greater than said second lower value;

(F) comparing the lower n bits of said first exponent part with the lower n bits of said second exponent part when said first higher value is equal to said second higher value plus one to provide a sixth result of comparison by judging whether said first lower value is less than, equal to, or greater than said second lower value;

(G) producing, as said first right-shift amount, a shift amount exceeding said first predetermined natural number (G1) when the first and the second results of comparison indicate that said first higher value is less than said second higher value and that said second higher value is not equal to said first higher value plus one or (G2) when the second and the fifth results of comparison indicate that said second higher value is equal to said first higher value plus one and that said first lower value is not greater than said second lower value;

(Hb) subtracting a first lower number represented by lower (n+1) bits of said first exponent part from a second lower number represented by the lower (n+1) bits of said first exponent part to produce, as said first right-shift amount, a first result of subtraction (Hb1) when the second and the fifth results of comparison indicate that said second higher value is equal to said first higher value plus one and that said first lower value is greater than said second lower value or (Hb2) when the first and the fourth results of comparison indicate that said first higher value is equal to said second higher value and that said first lower value is not greater than said second lower value;

(Ia) producing, as said first right-shift amount, a shift amount of zero (Ia1) when the first result of comparison indicates that said first higher value is greater than said second higher value or (Ia2) when the first and the fourth results of comparison indicate that said first higher value is equal to said second higher value and that said first lower value is greater than said second lower value;

(J) producing, as said second right-shift amount, the shift amount of zero (J1) when the first result of comparison indicates that said first higher value is less than said second higher value or (J2) when the first and the fourth results of comparison indicate that said first higher value is equal to said second higher value and that said first lower value is not greater than said second lower value;

(Ka) subtracting said second lower number from said first lower number to produce, as said second right-shift amount, a second result of subtraction (Ka1) when the third and the sixth results of comparison indicate that said first higher value is equal to said second higher value plus one and that said first lower value is not greater than said second lower value or (Ka2) when the first and the fourth results of comparison indicate that said first higher value is equal to said second higher value and that said first lower value is greater than said second lower value; and (La) producing, as said second right-shift amount, the shift amount exceeding said first predetermined natural number (La1) when the first and the third results of comparison indicate that said first higher value is greater than said second higher value and that said first higher value is not equal to said second higher value plus one or (La2) when the third and the sixth result of comparison indicate that said first higher value is equal to said second higher value plus one and that said first lower value is greater than said second lower value.

29. A method of calculating a shift amount for use in a floating-point arithmetic unit performing floating-point arithmetic of first and second input data which are represented by a floating-point representation and composed of first and second exponent parts and first and second mantissa parts, each of said first and said second mantissa parts being N bits long, where N represents a first predetermined natural number which is greater than $2^{n-1}$ and is not greater than $2^n$, where n represents a predetermined positive integer, each of said first and said second exponent parts being M bits long, where M represents a second predetermined natural number which is greater than said predetermined positive integer plus one, said shift amount consisting of first and second right-shift amounts for use rightwards shifting said first and said second mantissa parts, respectively, said method comprising the steps of:

(A) comparing higher (M−n) bits of said first exponent part with the higher (M−n) bits of said second exponent part to provide a first result of comparison by judging whether a first higher value is represented by the higher (M−n) bits of said first exponent part to be less than, equal to, or greater than a second higher value represented by the higher (M−n) bits of said second exponent part;

(B) comparing the higher (M−n) bits of said first exponent part with the higher (M−n) bits of said second exponent part when said first higher value is less than said second higher value to provide a second result of comparison by judging whether or not said second higher value is equal to said first higher value plus one;

(C) comparing the higher (M−n) bits of said first exponent part with the higher (M−n) bits of said second exponent part when said first higher value is greater than said second higher value to provide a third result of comparison by judging whether or not said first higher value is equal to said second higher value plus one;

(D) comparing lower n bits of said first exponent part with the lower n bits of said second exponent part when said first higher value is equal to said second higher value to provide a fourth result of comparison by judging whether a first lower value is represented by the lower n bits of said first exponent part to be less than, equal to, or greater than a second lower value represented by the lower n bits of said second exponent part;

(E) comparing the lower n bits of said first exponent part with the lower n bits of said second exponent part when said second higher value is equal to said first higher value plus one to provide a fifth result of comparison by judging whether said first lower value is less than, equal to, or greater than said second lower value;

(F) comparing the lower n bits of said first exponent part with the lower n bits of said second exponent part when said first higher value is equal to said second higher value plus one to provide a sixth result of comparison by judging whether said first lower value is less than, equal to, or greater than said second lower value;

(Ga) producing, as said first right-shift amount, a shift amount exceeding said first predetermined natural number (Ga1) when the fist and the second results of comparison indicate that said first higher value is less than said second higher value and that said second higher value is not equal to said first higher value plus one or (Ga2) when the second and the fifth results of comparison indicate that said second higher value is equal to said first higher value plus one and that said first lower value is less than said second lower value;

(Hc) subtracting a first lower number represented by lower (n+1) bits of said first exponent part from a second lower number represented by the lower (n+1) bits of said first exponent part to produce, as said first right-shift amount, a first result of subtraction (Hc1) when the second and the fifth results of comparison indicate that said second higher value is equal to said first higher value plus one and that said first lower value is not less than said second lower value or (Hc2) when the first and the fourth results of comparison indicate that said first higher value is equal to said second higher value and that said first lower value is not greater than said second lower value;

(Ia) producing, as said first right-shift amount, a shift amount of zero (Ia1) when the first result of comparison indicates that said first higher value is greater than said second higher value or (Ia2) when the first and the fourth results of comparison indicate that said first higher value is equal to said second higher value and that said first lower value is greater than said second lower value;

(Ja) producing, as said second right-shift amount, the shift amount of zero (Ja1) when the first result of comparison indicates that said first higher value is less than said second higher value or (Ja2) when the first and the fourth results of comparison indicate that said first higher value is equal to said second higher value and that said first lower value is less than said second lower value;

(Kc) subtracting said second lower number from said first lower number to produce, as said second right-shift amount, a second result of subtraction (Kc1) when the third and the sixth results of comparison indicate that said first higher value is equal to said second higher value plus one and that said first lower value is not greater than said second lower value or (Kc2) when the first and the fourth results of comparison indicate that said first higher value is equal to said second higher value and that said first lower value is not less than said second lower value; and (La) producing, as said second right-shift amount, the shift amount exceeding said first predetermined natural number (La1) when the first and the third results of comparison indicate that said first higher value is greater than said second higher value and that said first higher value is not equal to said second higher value plus one or (La2) when the third and the sixth result of comparison indicate that said first higher value is equal to said second higher value plus one and that said first lower value is greater than said second lower value.

* * * * *